United States Patent
Gao et al.

(10) Patent No.: US 9,998,854 B2
(45) Date of Patent: Jun. 12, 2018

(54) ACCESS POINT MOBILITY INDICATION

(71) Applicant: QUALCOMM Incorporated, San Diego, CA (US)

(72) Inventors: Weihua Gao, San Jose, CA (US); Meghna Agrawal, Sunnyvale, CA (US); Gengsheng Zhang, Cupertino, CA (US); Ju-Yong Do, Cupertino, CA (US); Sai Pradeep Venkatraman, Santa Clara, CA (US)

(73) Assignee: QUALCOMM Incorporated, San Diego, CA (US)

( * ) Notice: Subject to any disclaimer, the term of this patent is extended or adjusted under 35 U.S.C. 154(b) by 0 days. days.

(21) Appl. No.: 15/096,203

(22) Filed: Apr. 11, 2016

(65) Prior Publication Data

US 2017/0295458 A1    Oct. 12, 2017

(51) Int. Cl.
*H04W 4/02* (2018.01)
*H04W 64/00* (2009.01)
(Continued)

(52) U.S. Cl.
CPC ............ *H04W 4/02* (2013.01); *H04B 17/318* (2015.01); *H04W 64/003* (2013.01); *H04W 64/006* (2013.01)

(58) Field of Classification Search
CPC ... H04W 4/02; H04W 64/003; H04W 64/006; H04W 76/027; H04W 48/20; H04W 84/005; H04B 17/318
(Continued)

(56) References Cited

U.S. PATENT DOCUMENTS 7,574,217 B1    8/2009  Leung et al.
7,929,905 B1 *  4/2011  Warner ............... H04B 7/2606
                                                        455/10

(Continued)

FOREIGN PATENT DOCUMENTS

EP        2362702 A1    8/2011
WO   WO-2014004414 A1   1/2014
WO   WO-2014004591 A1   1/2014

OTHER PUBLICATIONS

International Search Report and Written Opinion—PCT/US2017/022149—ISA/EPO—dated Jul. 6, 2017.

*Primary Examiner* — Inder Mehra
(74) *Attorney, Agent, or Firm* — Thien T. Nguyen

(57) ABSTRACT

Methods for mobility indication of wireless Access Points (APs) are disclosed. An AP may determine mobility indication information, based, in part, on at least one of: configuration information on the AP pertaining to mobility; and/or wireless signal measurements associated with the AP, and/or captured images associated with the AP, and/or sensor measurements associated with the AP. The AP may transmit the mobility indication information for the AP. The mobility indication information may indicate that the AP is mobile and/or characterize the mobility. The mobility indication information may further include a request to remove information associated with the AP from location determination databases, location assistance databases, and/or base station almanacs. Disclosed methods also pertain to a User Equipments (UE), which may receive wireless signals with mobility indication information associated with an AP; and determine a suitability of the AP for determining the UEs location based on the received mobility indication information.

24 Claims, 11 Drawing Sheets

(51) Int. Cl.
*H04W 48/20* (2009.01)
*H04B 17/318* (2015.01)

(58) Field of Classification Search
USPC ......... 455/404.2, 414.1, 414.2, 414.3, 422.1,
455/456.1, 226.2, 441, 434, 435.3, 525,
455/431; 340/524, 7.2
See application file for complete search history.

(56) References Cited

U.S. PATENT DOCUMENTS

| | | | |
|---|---|---|---|
| 8,089,405 B2 | 1/2012 | Piersol et al. | |
| 8,571,578 B1 | 10/2013 | Chen et al. | |
| 8,711,034 B2 | 4/2014 | Piersol et al. | |
| 2003/0220116 A1* | 11/2003 | Sagefalk | G01S 5/0252 |
| | | | 455/456.1 |
| 2008/0267114 A1 | 10/2008 | Mukherjee et al. | |
| 2008/0318596 A1 | 12/2008 | Tenny | |
| 2011/0012780 A1 | 1/2011 | Alizadeh-Shabdiz | |
| 2012/0129461 A1 | 5/2012 | Venkatraman | |
| 2013/0188508 A1 | 7/2013 | Cho et al. | |
| 2014/0273958 A1* | 9/2014 | Messana | H04L 63/0884 |
| | | | 455/411 |
| 2016/0004892 A1* | 1/2016 | Marsh | G06Q 20/18 |
| | | | 340/10.51 |
| 2016/0135103 A1* | 5/2016 | Lee | H04W 28/08 |
| | | | 455/444 |
| 2016/0192151 A1* | 6/2016 | Marri Sridhar | H04W 4/025 |
| | | | 455/418 |
| 2016/0302143 A1* | 10/2016 | Karlsson | H04W 48/20 |
| 2017/0048830 A1* | 2/2017 | Kimura | H04M 3/00 |
| 2017/0111954 A1* | 4/2017 | Wilhelmsson | H04W 76/027 |

\* cited by examiner

700

START

710
Determine a mobility indication information of a first AP, based, in part, on at least one of:
configuration information on the first AP pertaining to mobility of the first AP,
wireless signal measurements associated with the first AP, or
captured images associated with the first AP, or
sensor measurements associated with the first AP, or
any combinations thereof.

720
Transmit the mobility indication information.

730
STOP

Fig. 7

ACCESS POINT MOBILITY INDICATION

FIELD

The subject matter disclosed herein relates to location determination and specifically, to location determination in an environment that includes mobile and/or self-aware wireless access points.

BACKGROUND

It is often desirable to perform positioning functions on user equipment (UE) such as a mobile terminal, a cellular phone or other mobile device. The terms "location" and "position" are synonymous and are used interchangeably herein. To estimate the location of a UE, various techniques such as Advanced Forward Link Trilateralation (AFLT), Round Trip Time (RTT) measurements, Reference Signal Time Difference (RSTD). Observed Time Difference of Arrival (OTDOA) etc may be used.

Conventionally, the above techniques may use known or predetermined locations of Access Points (APs) and/or Base Stations (collectively referred to as APs herein) to determine the position of a UE. However, when APs are mobile (e.g. the position or location of the AP changes over some time period), UE locations that are determined using conventional location determination techniques based on the known locations of APs using may be unreliable and/or inaccurate.

SUMMARY

In some embodiments, a method on a first Access Point (AP) may comprise: determining a mobility indication information of the first AP, based, in part, on at least one of: configuration information on the first AP pertaining to mobility of the first AP, or wireless signal measurements associated with the first AP, or captured images associated with the first AP, or sensor measurements associated with the first AP; or any combinations thereof; and transmitting the mobility indication information.

In another aspect, an apparatus may comprise: a memory; a processor coupled to the memory and configured to: determine a mobility indication information of the apparatus, based, in part, on at least one of: configuration information pertaining to mobility of the apparatus, or wireless signal measurements, or sensor measurements associated with the apparatus, or captured images associated with the apparatus, or any combinations thereof; and a transceiver configured to: transmit the mobility indication information.

In a further aspect, an apparatus may comprise: means for determining a mobility indication information of the apparatus, based, in part, on at least one of: configuration information pertaining to mobility of the apparatus, or wireless signal measurements, or sensor measurements associated with the apparatus, or captured images associated with the apparatus, or any combinations thereof; and means for transmitting the mobility indication information.

In some embodiments, a non-transitory computer-readable medium may comprise instructions that are executable by a processor to: determine a mobility indication information of the AP, based, in part, on at least one of: configuration information on the AP pertaining to mobility of the first AP, or wireless signal measurements associated with the AP, or captured images associated with the AP, or sensor measurements associated with the AP, or any combinations thereof; and transmit the mobility indication information.

In some embodiments, a method on a User Equipment (UE) may comprise: receiving wireless signals, wherein the wireless signals comprise mobility indication information associated with an AP; and determining, based on the received mobility indication information associated with the AP, a suitability of the AP for determining a location of the UE.

In another aspect, a User Equipment (UE) may comprise: a transceiver, the transceiver to receive wireless signals comprising mobility indication information associated with an AP, and a processor coupled to the transceiver, wherein the processor is configured to: determine, based on the received mobility indication information associated with the AP, a suitability of the AP for determining a location of the UE.

In a further aspect, an apparatus may comprise: transceiver means to receive wireless signals comprising mobility indication information associated with an AP, and means for determining, based on the received mobility indication information associated with the AP, a suitability of the AP for determining a location of the UE.

In some embodiments, a non-transitory computer-readable medium may comprise instructions that are executable by a processor to: receive wireless signals comprising mobility indication information associated with an AP, and determine, based on the received mobility indication information associated with the AP, a suitability of the AP for determining a location of the UE.

The methods disclosed may be performed by one or more of: APs, and/or servers (including location servers), UEs, etc. using various protocols. Embodiments disclosed also relate to software, firmware, and program instructions created, stored, accessed, read or modified by processors using non-transitory computer readable media or computer readable memory.

BRIEF DESCRIPTION OF THE DRAWINGS

Embodiments of the invention will be described, by way of example only, with reference to the drawings.

FIG. 7 shows a flowchart of an exemplary method 700 to determine mobility indication information for an AP.

DETAILED DESCRIPTION

Figure 1:
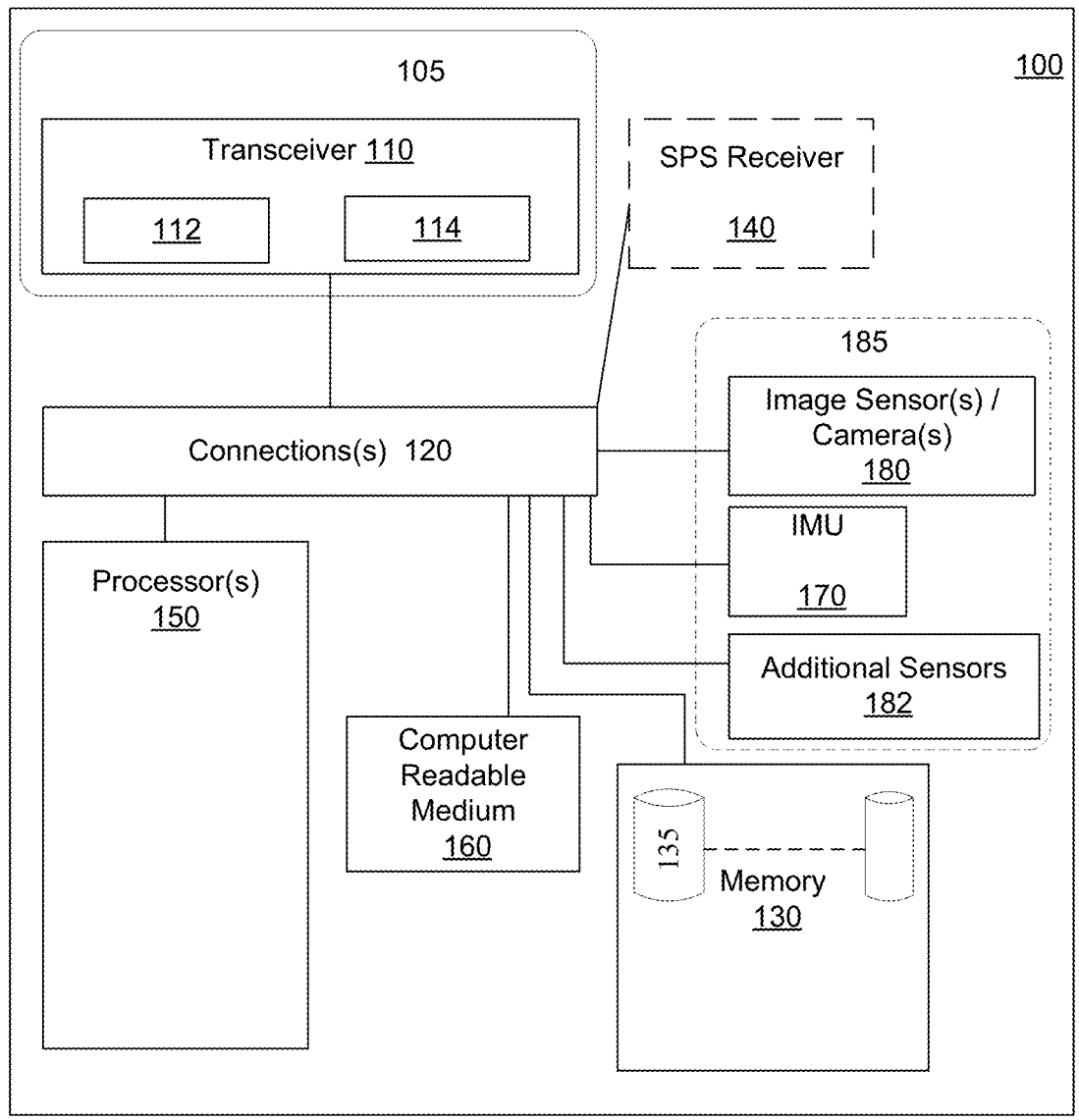
FIG. 1 shows a schematic block diagram illustrating certain exemplary features of AP100.

Embodiments disclosed facilitate positioning related operations, in part, by facilitating AP mobility indication. A device may be considered mobile if it is not stationary. The term "mobility indication" is used to refer to a classification of or categorization of mobility and/or a characterization of the mobility. For example, the mobility indication may indicate that an AP is mobile. As another example, the mobility indication may provide a speed and a direction of travel of an AP. As a further example, the mobility indication may provide a range of displacement and/or a radius of displacement over which an AP moves. For example, coordinates (e.g. latitude, longitude, altitude) that bound an area or range over which an AP moves may be provided as part of the mobility indication. In some embodiments, the range may be specified as some function of one or more coordinates. For example, a coordinate (e.g. center) and a radius may be provided to indicated an area (e.g. a circle) over which an AP moves. In some embodiments, if an AP is mobile during some time periods but not during others, then the time periods associated with mobility (or conversely time periods when the AP is stationary) may be provided as part of the mobility indication. In some embodiments, when an AP is mobile, the AP may be placed into one or more categories depending on the speed of movement and the categorization may be provided as part of the mobility indication. In some embodiments, a location uncertainty may be provided as part of the mobility indication. For example, the location uncertainty may be inversely proportional to the speed of movement of the AP or a function of the range over which an AP moves and/or as a function of the elapsed time from the time the mobility indication information was determined.

In general, the mobility indication may include any information pertaining to or describing the mobility of a device/AP. The mobility indication may include information about whether the AP is mobile. In some embodiments, the mobility indication may further include one or more of: (i) a time at which the mobility indication was determined; (ii) a current location of the device; (iii) information related to a range of displacement of the AP, (iv) information related to a speed and/or a direction of movement of the AP, (v) information related to one or more time periods during which the AP is mobile, (vi) location uncertainty information associated with the AP, (vi) information related to use of the AP (and/or any provided mobility indication information) for location determination purposes, (vi) a period of validity or an expiry time for the mobility indication information, (vii) vehicle related information, such as a vehicle or a vehicle type (e.g. car, train drone, balloon, etc.), with which a mobile AP may be associated; and/or (viii) a pattern of movement associated with a device/AP. For example, the mobility characterization information may include information about a vehicle within which an AP resides, or a vehicle or a vehicle type on which the AP may be mounted. In situations where the AP is associated with a vehicle whose motion may be predicted or is known in advance (e.g. an AP associated with a train that loops between airport terminals, or a public transport bus with a timetable and fixed stops), a pattern of movement may be provided as part of the mobility indication information, where the pattern of movement may indicate and/or may be used to predict the likely position of the AP/vehicle at a given time.

Mobility indication information may be used to determine the suitability of an entity (e.g. AP) transmitting the information for location determination. For example, if an AP is stationary, a known location of the AP may be used for location determination. As another example, if the AP is mobile, then suitability of the AP for location determination may be based on the content of the mobility indication information. For example, if the mobility indication information for an AP specifies a range of displacement, then, as one possibility, the entity receiving the mobility indication information may be placed, at least initially, at some location within that range. As another example, if an AP merely indicates that it is mobile without providing additional mobility indication information, the AP may, as one possibility, be marked as not suitable for location determination by the entity receiving the mobility indication information.

Disclosed embodiments also pertain to determination and/or reporting/self-reporting of AP mobility indication information. Disclosed embodiments pertain, in some aspects, to "self-aware" APs, which may autonomously determine that they are mobile, based on a configuration of the AP and/or based on signal measurements obtained by the AP. For example, an AP may have configuration information or configuration settings such as factory settings, pre-configured settings, and/or be configured by a manufacturer or a user with mobility indication information. The term "configuration information" and "configuration settings" are used synonymously herein and used to refer to information pertaining to a device configuration whereby values may be assigned to one or more device parameters. For example, memory (e.g. a Flash Programmable Read Only Memory (PROM)/Non-Volatile Random Access Memory (NVRAM)) on the device may be configured with information pertaining to mobility. As one example, an AP outfitted on an aerial drone or another vehicle may be configured/pre-configured to indicate that it is mobile. In some embodiments, APs may determine mobility based, in part, on measurements obtained from one or more sensors and/or wireless measurements. For example, measurements by sensors on the AP, and/or coupled to the AP, and/or information obtained by the AP may be used to determine mobility indication.

In some embodiments, upon a determination that an AP is mobile, the AP may transmit mobility indication information. The term "transmit" as used herein is used broadly and, unless specified otherwise, may refer to unicast (transmission to a specific device), multicast (transmission to a plurality of devices) and broadcast (a transmission available to all devices within range). For example, the AP may transmit information: (i) reporting that the AP is a mobile AP; and/or (ii) specifying that the AP is not to be used for position/location determination; and/or (iii) providing details pertaining to the AP's mobility characteristics, which may allow intelligent use of the AP for location determination purposes. In some embodiments, upon a determination that an AP is mobile, the AP and/or another entity may request removal of location information related to AP from one or more databases used for positioning. In some embodiments, upon receiving information that an AP is mobile, a location server or another entity used for location determination may remove information pertaining to the location of the AP and/or other positioning related information from one or more databases used for location determination purposes.

Disclosed embodiments also facilitate AP mobility indication. In some embodiments, APs may determine mobility based, in part, on measurements obtained from one or more sensors and/or wireless measurements. For example, measurements by sensors on the AP, and/or coupled to the AP, and/or information obtained by the AP may be used to: (i) determine that the AP is mobile, and/or (ii) provide information about characteristics of the AP, including characteristics or other information relating to mobility. Upon a determination by an AP that it is mobile, the AP may report the mobility characterization information to one or more of: a location server, a location assistance server, other APs and/or UEs, and/or another entity used for location determination. In some embodiments, AP mobility indication for one or more APs may specify how the mobility indication information pertaining to the one or more APs is to be used when used for location determination purposes. In some embodiments, the mobility indication information may be provided as part of location assistance information.

The term "Access Point" or "AP" as used herein, may refer to a base station or wireless access point that are used to enable devices to wirelessly connect to a network. The terms "Access Point" or "AP" are also used to refer to or other devices, which may be referred to as "range extenders", "signal boosters", femtocells, nanocells, or microcells, etc. that are used facilitate network connectivity. In some embodiments, "access points" or "APs" may be mounted on terrestrial vehicles, such as cars and trains, or aerial vehicles including airplanes (including drones and/or remotely controlled aerial vehicles), balloons, nautical vehicles, buoys, etc and may be used to provide or enhance wireless network connectivity over some area. For example, aerial or mobile APs may be used to provide or enhance network coverage for special events where network connectivity and/or network bandwidth may be limited or unavailable. As another example, APs are increasingly available in many public transport vehicles including buses, trains and airplanes.

The term AP is also used to refer to devices, including mobile devices that are capable of providing wireless network access functionality such as by "tethering" and/or serving as "mobile hotspots". For example, a mobile phone or other UE may serve as a wireless access point or wireless hotspot and provide network access functionality to other devices including UEs. The term AP is also intended to refer to devices that provide network connectivity in an "ad hoc network" such as a wireless ad hoc network and/or a peer-to-peer (P2P) network.

The terms "user equipment" (UE) or "mobile station" (MS), may refer to a device such as a cellular or other wireless communication device, personal communication system (PCS) device, personal navigation device (PND), Personal Information Manager (PIM), Personal Digital Assistant (PDA), laptop or other suitable mobile device which is capable of receiving wireless communication and/or navigation signals. The terms are also intended to include devices which communicate with a personal navigation device (PND), such as by short-range wireless, infrared, wireline connection, or other connection—regardless of whether satellite signal reception, assistance data reception, and/or position-related processing occurs at the device or at the PND.

In addition, the terms UE, "mobile station" or "target" are intended to include all devices, including wireless and wireline communication devices, computers, laptops, etc. which are capable of communication with a server, such as via the Internet, WiFi, cellular wireless network, DSL network, packet cable network or other network, and regardless of whether satellite signal reception, assistance data reception, and/or position-related processing occurs at the device, at a server, or at another device associated with the network. Any operable combination of the above are also considered UEs.

FIG. 1 shows a schematic block diagram illustrating certain exemplary features of AP 100 in accordance with certain embodiments presented herein. In some embodiments, functions on AP 100 may be triggered based on one or more of: configuration settings, and/or wireless signal measurements and/or sensor based measurements.

AP 100 may include one or more processing units or processor(s) 150 and memory 130. AP 100 may also include a wireless network interface 105. In some embodiment, wireless network interface may include transmitter 112 and receiver 114. Transceiver 110 may, for example, include a transmitter 112 enabled to transmit one or more signals over one or more types of wireless communication networks and a receiver 114 to receive one or more signals transmitted over one or more types of wireless communication networks. In some embodiments, AP 100/wireless network interface 105 may optionally include Global Navigation Satellite System (GNSS) or Satellite Positioning System (SPS) receiver 140. In some embodiments, optional SPS receiver 140 may be enabled to receive signals associated with one or more SPS/GNSS resources. Received GNSS signals may be used to determine a position and/or velocity (speed and direction of movement) of AP 100. AP 100 may further comprise computer-readable medium 160. Functional components on AP 100 may be operatively coupled to each other with one or more connections 120 (e.g., buses, lines, fibers, links, etc.). In certain example implementations, all or part of AP 100 may take the form of a chipset, and/or the like.

In some embodiments, AP 100 may optionally comprise image sensors such as CCD or CMOS sensors and/or camera(s) 180, which are hereinafter referred to as "camera(s) 180". Camera(s) 180 may convert an optical image into an electronic or digital image and may send captured images to processor(s) 150. In some embodiments, camera(s) 180 may include multiple cameras, front and/or rear facing cameras, wide-angle cameras, and may also incorporate CCD, CMOS, and/or other sensors. Camera(s) 180, which may be still and/or video cameras, may capture a series of 2-Dimensional (2D) still and/or video image frames of an environment and send the captured image frames to processor(s) 150. In some embodiments, for example, when AP 100 is embodied in a wearable device, camera(s) 180 may take the form of a wearable camera, or an external camera, which may be operationally coupled to, but housed separately from, other functional units in AP 100.

In some embodiments, images captured by camera(s) 180 may be used to determine that AP 100 is mobile. For example, images captured by camera(s) 180 may be used to trigger Vision Based Positioning (VBP). For example, an image of a landmark or point of interest captured by camera(s) 180 in the vicinity of AP 100 may be used to determine a location of AP 100. Mobility may be determined based on location changes determined using VBP techniques. In some embodiments, a 6 Degrees of Freedom (6DoF) pose of the AP may be determined using Visual Simultaneous Localization and Mapping (VSLAM) based on feature points in images and movement may be determined based on pose changes relative to some landmark or feature. In some embodiments, visual odometry techniques may be used to determine movement. The visual or image based techniques above may be used independently and/or in conjunction with input from other sensors such as Inertial Measurement Unit 170, SPS receiver 140, etc.

In some embodiments, AP 100 may optionally include Inertial Measurement Unit (IMU) 170. IMU 170 may comprise 3 axis accelerometer(s), 3-axis gyroscope(s), and/or magnetometer(s), may provide velocity, orientation, and/or other position related information to processor(s) 150. In some embodiments, the output of IMU 170 may be used by processor(s) 150 to determine a position and orientation AP 100 and/or determine that AP 100 is mobile. For example, when wireless signal and/or GNSS based positioning is unavailable, measurements by IMU 170 may be used from a preceding reliable position estimate to estimate a current location of AP 100 and/or to determine or provide an indication of mobility. In some embodiments, measurements by IMU 170, sensors 182, images captured by camera(s) 180, and/or wireless signal measurements may be time-stamped with a time of capture.

In some embodiments, AP100 may include various optional additional sensors 182. In some embodiments, additional sensors 182 may optionally include one or more of: a magnetometer, an altimeter, and/or a barometer, which may provide inputs to processor(s) 150 to facilitate position determination. For example, measurements by the altimeter (when present) may be used to provide an indication of altitude above a calibrated level, while the measurements by the barometer (when present) may provide an indication of atmospheric pressure, which may also be used to obtain a determination of altitude. As another example, the magnetometer (when present) may be capable of measuring the intensity and/or the direction of the Earth's magnetic field and may serve as a compass and/or provide measurements that may be use to obtain an indication of a direction of travel of AP 100. Additional sensors 182 may optionally include biometric sensors, which may record movement of a body based on biometric information, etc. For example, a wearable AP 100 may comprise biometric sensors that may determine that a subject/AP is mobile. In some embodiments, additional sensors 182 may optionally include one or more of ultrasonic transducers, rangefinders, and/or depth sensors, which may be used to acquire depth information and/or determine distance. In general, the list of sensors above in not exhaustive. Input from sensors 185 on APs 100 may be provided to processor(s) 150 and may be used to obtain an indication of mobility of AP 100.

In some embodiments, one or more functional components of AP 100 may be physically separate but operationally coupled to other functional components as indicated by the dashed lines in FIG. 1. For example, SPS receiver 140 (when present) and sensors 185 (when present—e.g. image sensors/camera(s) 180, additional sensors 182, and/or Inertial Measurement Unit (IMU) 170) may be physically separate but operationally coupled to processor(s) 150 and/or other functional units in AP 100. As one example, one or more sensors such as SPS receiver 140, and/or camera(s) 180 and/or IMU 170 and/or additional sensors 182 may be physically separate by operatively or communicatively coupled to AP 100.

Processor(s) 150 may be implemented using a combination of hardware, firmware, and software. In some embodiments, processor(s) 150 may use information derived from sensor and wireless measurements by AP 100 either independently, and/or in conjunction with received location assistance data to determine mobility of AP 100. In some embodiments, AP 100/processors 150 may receive assistance information and/or provide a mobility indication using any appropriate protocol. In some embodiments, location assistance information may include wireless measurement assistance information, a rough location estimate, locations of one more entities observed by the AP, etc. The assistance information may be used by processor(s) 150/receiver 114 to select a signal acquisition/measurement strategy and/or to determine an initial location and/or to refine an estimated location and/or to provide an indication of mobility of AP 100.

At locations where wireless signals are available, position determination and/or an indication of mobility may be determined using a variety of well-known techniques including GNSS/Satellite Positioning System (SPS) based positioning, Observed Time Difference of Arrival (OTDOA), Reference Signal Time Difference (RSTD), Advanced Forward Link Trilateralation (AFLT), hybrid SPS-AFLT techniques, Round Trip Time (RTT), Received Signal Strength Indicator (RSSI), etc. At locations where GNSS/SPS signals may not be available, Wireless Wide Area Network (WWAN) and/or Wireless Local Area Network (WLAN) based positioning, hybrid IMU-wireless techniques, and/or VBP may be used to estimate a location of AP 100 and/or determine that AP 100 is mobile.

In some embodiments, receiver 114 on AP 100 may receive assistance information, which may be processed by processor(s) 150 to determine whether AP 100 is mobile. In some embodiments, processor(s) 150 may communicate or initiate communication of AP mobility indication information to a server or another entity coupled to AP 100 through transmitter 112 in transceiver 110. In some embodiments, processor(s) 150 may determine that AP 100 is mobile based on signal measurements from a plurality of wireless networks and/or the relative strengths of signals from the plurality of observed wireless networks observed over some time period. For example, processor(s) 150 may measure a corresponding Received Signal Strength Indicator (RSSI) for each of a plurality of wireless networks over some time period to determine that it is mobile. In some embodiments, AP 100 may determine that it is mobile if it observes several different wireless networks over some time period. For example, base station ID (BSID), system ID (SID) or network ID (NID), Medium Access Control (MAC) address, Basic Service Set Identification (BSSID), Service Set Identifier (SSID), and/or other wireless network signal related changes, as determined by AP observations or measurements (e.g. as observed/measured by receiver 114) may be used to determine that AP 100 is mobile.

The elements and methodologies described herein may be implemented by various means depending upon the application. For example, these elements and methodologies may be implemented in hardware, firmware, software, or any combination thereof. For example, for a hardware implementation, the processor(s) 150 may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof. The techniques disclosed may also be implemented using hardware (e.g. using functionality provided by an ASIC in processor(s) 150), software running on processor(s) 150, and/or firmware or stored in memory 130, or some combination thereof.

For a firmware and/or software implementation, the methodologies may be implemented using program code, microcode, procedures, functions, and so on that perform the functions described herein. Any machine-readable medium tangibly embodying instructions may be used in implementing the methodologies described herein. For example, program code may be stored in a non-transitory computer-readable medium 160 or memory 130 that is connected to and executed by processor(s) 150.

Memory may be implemented within processor(s) 150 or external to processor(s) 150. As used herein the term "memory" refers to any type of long term, short term, volatile, nonvolatile, or other memory and is not to be limited to any particular type of memory or number of memories, or type of media upon which memory is stored. In some embodiments, memory 130 may hold program code that facilitates position location, and/or AP mobility indication. For example, one or more of wireless signal measurements, measurements by IMU 170, measurements by sensors 185 may stored in memory and may be used by program code to determine mobility of AP 100 and/or to provide an indication of mobility. In some embodiments, memory 130 and/or databases 135 in memory 130 may hold information about wireless signals observed, a location of AP 100, or mobility indication information pertaining to AP 100, and/or information about the location of one or more other observed APs or network entities and the time(s) of observation of the other APs/network entities. In some embodiments, information in memory 130 and/or databases 135 in memory 130 of AP 100 may indicate whether information associated with other observed APs/network entities may be used for location determination.

If implemented in firmware and/or software, the functions may be stored as one or more instructions or program code on a computer-readable medium, such as medium 160 and/or memory 130. Examples include computer-readable media encoded with computer programs and data associated with or used by the program. For example, the computer-readable medium including program code stored thereon may include program code to support hybrid photo mapping and navigation in a manner consistent with disclosed embodiments. The code may further support AP mobility determination, providing an indication of AP mobility and various position determination techniques including SPS/Advanced Forward Link Trilateration (AFLT)/hybrid-AFLT/RSSI/Reference Signal Time Difference (RSTD)/OT-DOA/RTT based measurement and positioning, in part, by using location assistance information.

Computer-readable medium 160 includes physical computer storage media. A storage medium may be any available medium that can be accessed by a computer. By way of example, and not limitation, such non-transitory computer-readable media can comprise RAM, ROM, EEPROM, CD-ROM, flash memory, or other optical disk storage, magnetic disk storage or other magnetic storage devices, or any other medium that can be used to store desired program code in the form of instructions and/or data and that can be accessed by a computer; disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

In addition to storage on computer readable medium 160, instructions and/or data may be provided as signals on transmission media included in a communication apparatus. For example, a communication apparatus may include a transceiver 110, which may receive signals through receiver 114 indicative of instructions and data. The instructions and data may cause one or more processors to implement SPS/AFLT/hybrid-AFLT/RSTD/OTDOA measurement and positioning, and/or other functions outlined herein. That is, the communication apparatus includes transmission media with signals indicative of information to perform disclosed functions.

Memory 130 may represent any data storage mechanism. Memory 130 may include, for example, a primary memory and/or a secondary memory. Primary memory may include, for example, a random access memory, read only memory, etc. While illustrated in this example as being separate from processor(s) 150, it should be understood that all or part of a primary memory may be provided within or otherwise co-located/coupled with processor(s) 150. Secondary memory may include, for example, the same or similar type of memory as primary memory and/or one or more data storage devices or systems, such as, for example, a disk drive, an optical disc drive, a tape drive, a solid state memory drive, etc.

In certain implementations, secondary memory may be operatively receptive of, or otherwise configurable to couple to a non-transitory computer-readable medium 160. As such, in certain example implementations, the methods and/or apparatuses presented herein may take the form in whole or part of a computer-readable medium 160 that may include computer implementable instructions stored thereon, which when executed by at least one processor(s) 150 may be operatively enabled to perform all or portions of the example operations as described herein. Computer readable medium 160 may be a part of memory 130.

Figure 2:
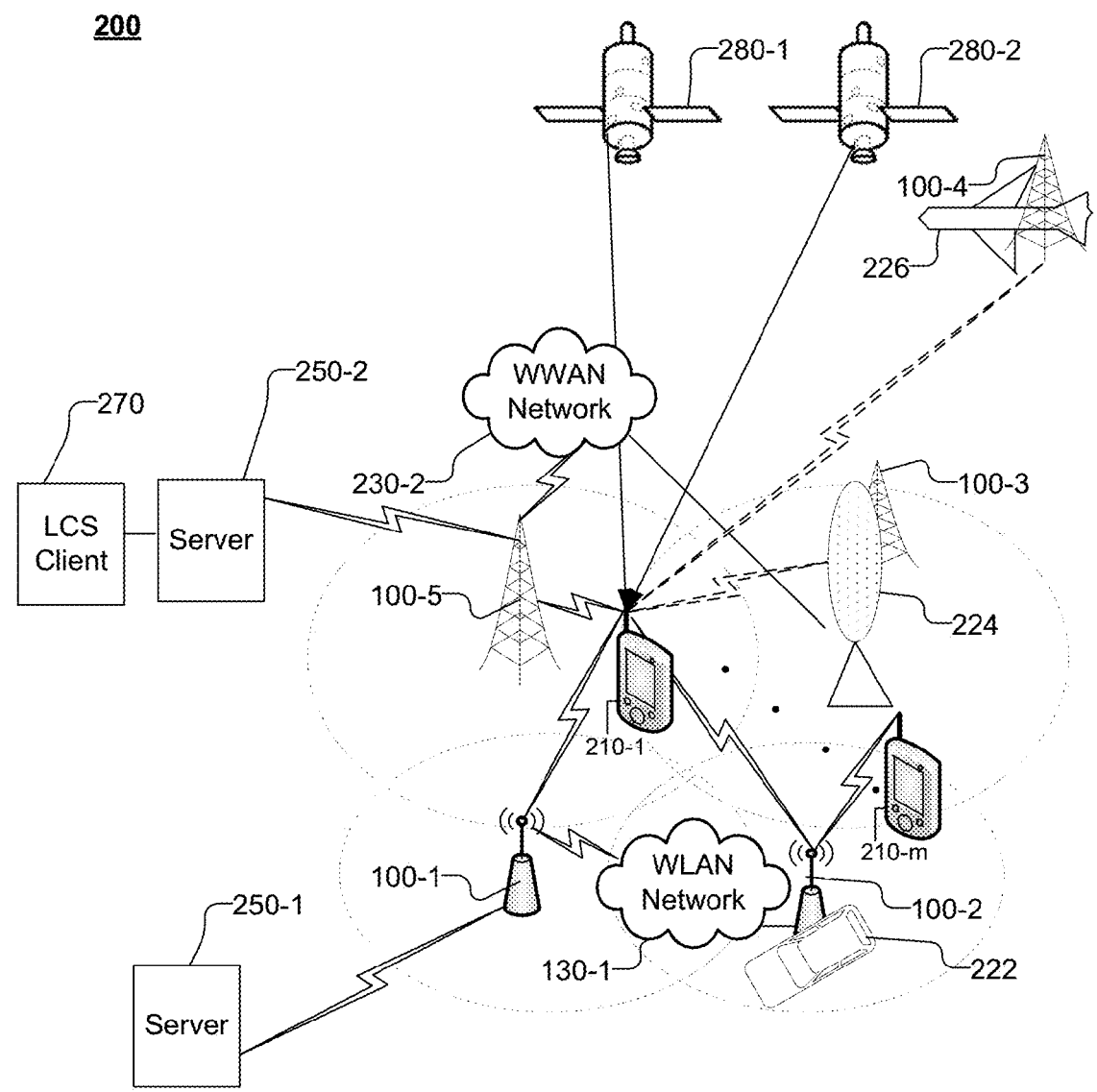
FIG. 2 shows an architecture of a system 200 capable of supporting access point mobility indication.

FIG. 2 shows an architecture of a system 200 capable of supporting access point mobility indication. In some embodiments, system 200 may facilitate AP mobility indication determination. System 200 may include one or more APs 100-$i$ (collectively referred to as APs 100), one or more UEs 210, and servers 250. Location services may include the transfer of location assistance data and/or AP mobility indication information using any appropriate protocol. For example, messages (e.g. Long Term Evolution (LTE) Positioning Protocol (LPP) or LPP extensions (LPPe) messages) between APs 100-$i$ ($1 \leq i \leq n$) (collectively referred to as APs 100), UEs 210-$j$ ($1 \leq j \leq m$) (collectively referred to as UEs 210) and server 250. Server 250 may take the form of a location server or another network entity. The transfer of mobility indication information may occur using any appropriate protocol and at a rate appropriate to entities involved in the transfer, such as APs 100-$i$, UEs 210, and servers 250-1 and/or 250-2 (collectively referred to as servers 250). For example, the transfer of location assistance and/or AP mobility indication information may occur over a Wireless Wide Area Network (WWAN) 230-2, Wireless Local Area Network (WLAN) 230-1 and/or a Wireless Personal Area Network (WPAN) (not shown in FIG. 2), and/or a ad-hoc network and/or a P2P network. Note that although APs 100 and UEs 210 are shown separately in FIG. 2, in some instances, UEs may also serve as APs, for example, in an ad-hoc or P2P network.

System 200 shows APs 240-1, 240-2, 240-3, 240-4 and 240-5. As shown in FIG. 2, APs 100-1 and 100-5 are stationary, while APs 100-2, 100-3, and 100-4 may be mobile APs. The term mobile APs is used to refer to APs that are not stationary and/or capable of movement. Although, a mobile AP may be stationary at some point in time, or over some time period, the AP may move at other times. For example, AP 100-2 may be stationary when vehicle/car 222 is parked, but may be mobile when vehicle 222 moves. In FIG. 2, AP 100-3 is mounted on balloon 224, while AP100-4 is mounted on airplane 226. In general, mobile APs 100 may be mounted on any mobile platform or vehicle and disclosed techniques may be used with mobile APs as described further herein. APs 100 may be in communication with one or more UEs 210. UEs 210 may be present in the vicinity of vehicle 222, and/or balloon 224 and/or airplane 226 and may be in communication with one or more of APs 100-2, 100-3, and/or 100-4.

APs 100-3, 100-4, and 100-5 may be coupled to server 250-2 directly and/or through WWAN 230-2, while APs 100-1 and 100-2 may be coupled to server 250-1 directly and/or through WLAN 230-1. Networks 230-1 and 230-2 are collectively referred to as networks 230. In addition, APs 100 may be communicatively to one or more other entities such as UEs 210, other APs 100, and/or other entities through a WPAN (not shown in FIG. 2). For simplicity, only two servers 250 are shown in FIG. 2. In general, system 200 may comprise multiple APs 100 that provide access to one or more WWANs and/or WLANs and/or WPANs and/or ad-hoc and/or P2P networks 230.

One or more APs 100 may be capable of wirelessly communicating with servers 250 directly and/or through one or more networks 230 that support location services/mobility indication. In some embodiments, servers 250 may comprise databases and/or almanacs with the locations of one or more APs 100. For example, servers 250 and/or UE 210 may use the known locations of one or more APs100-*i*, which are visible to UE 210, to estimate a location of UE 210. For example, the locations of one or more APs 100-*i* may be provided or determined by server 250 based on crowdsourcing by a plurality of UEs 210. These APs 100-*i* may serve as location anchors, so that if they are observed by UE 210 or another network entity, the location of the observing UE 210 may be determined based on the known location of the APs 100-*i*. In some embodiments, UE 210 may provide visible APs and/or wireless measurements of AP signals, and/or sensor measurements to server 250-2, which may use the measurements to determine a location of UE 210.

In some embodiments, upon determination that an AP 100-*i* (e.g. AP 100-2 and/or AP 100-3 and/or AP 100-4) is mobile, servers 250 (e.g. servers 250-1 and/or 250-2) may receive an indication of the mobility of the respective APs. In some embodiments, one or more APs 100-*i* may self-determine mobility and provide an indication of mobility to servers 250 and/or to other entities coupled to APs 100-*i*.

In some embodiments, upon receiving an indication of mobility of one or more APs 100, servers 250 may classify the APs 100 as mobile in one or more databases used for location determination/location assistance. In some embodiments, mobile APs 100 may be removed from location determination/location assistance databases. For example, mobile AP 100-2, which may be on vehicle 222, or mobile AP 100-3, which may be on balloon 100-3 may move at various times. Therefore, their locations (even if known at some point in time) cannot be relied upon to determine the locations of UEs 210. In some embodiments, when an AP 100-*i* is determined to be mobile and its location is known, then, depending on the speed at which AP 100-*i* is travelling, and/or a range of displacement for AP 100-*i* (a) location information associated with the AP 100-*i* may be given a validity period and/or (b) the location of the AP 100-*i* may be associated with a location uncertainty. As one example, the location uncertainty may be some function of speed. As another example, if the speed or location uncertainty of a mobile AP 100-*i* exceeds some threshold, then location information associated with the AP 100-*i* may be disregarded. As another example, when the speed of an AP 100-*i* is below some range, then location information associated with the AP 100-*i* may be de-weighted when used for position determination.

As illustrated in FIG. 2, UE 210 may communicate with server 250-2 through APs 100-1 and/or 100-2 using network 230-1, and/or through APs 100-3, 100-4 and/or 100-5 using network 230-2. In some embodiments, UE 210 may receive and measure signals from one or more stationary or non-mobile APs, such as AP 100-5, which may be used for position determination. In some embodiments, APs 100-3, 100-4 and/or 100-5 may form part of a wireless communication network, which may be a wireless wide area network (WWAN). A WWAN may be a Code Division Multiple Access (CDMA) network, a Time Division Multiple Access (TDMA) network, a Frequency Division Multiple Access (FDMA) network, an Orthogonal Frequency Division Multiple Access (OFDMA) network, a Single-Carrier Frequency Division Multiple Access (SC-FDMA) network, Long Term Evolution (LTE), WiMax and so on.

A CDMA network may implement one or more radio access technologies (RATs) such as cdma2000, Wideband-CDMA (W-CDMA), and so on. Cdma2000 includes IS-95, IS-2000, and IS-856 standards. A TDMA network may implement Global System for Mobile Communications (GSM), Digital Advanced Mobile Phone System (D-AMPS), or some other RAT. GSM, W-CDMA, and LTE are described in documents from 3GPP. Cdma2000 is described in documents from a consortium named "3rd Generation Partnership Project 2" (3GPP2). 3GPP and 3GPP2 documents are publicly available.

As illustrated in FIG. 2, UE 210 may also communicate with server 250-1 through APs 100-1 and/or 100-2 using network 230-1. UE 210 may receive and measure signals from stationary APs such as AP 100-1, which may be used for position determination. In some embodiments, APs 100-1 and 100-2 may form part of a wireless communication network 230-1, which may be a wireless local area network (WLAN). For example, a WLAN may be an IEEE 802.11x network.

Further, one or more UEs 210, may be communicatively coupled to one or more APs over a WPAN (not shown in FIG. 2). A WPAN may be a network based on the IEEE 802.15x standards, or some other type of network. For example, a WPAN may take the form of a Bluetooth, Infrared, and/or Near Field Communication (NFC) network. For example, a UE 210 in airplane 226 may be coupled over a WPAN (e.g. Bluetooth) or WLAN to wireless communication system in airplane 226, which in turn may be coupled to WWAN 230-2.

The techniques may also be implemented in conjunction with other combinations of WWAN, WLAN and/or WPAN. For example, APs 100-*i*, and networks 230 may form part of, e.g., an evolved UMTS Terrestrial Radio Access Network (E-UTRAN) (LTE) network, a W-CDMA UTRAN network, a GSM/EDGE Radio Access Network (GERAN), a 1×RTT network, an Evolution-Data Optimized (EvDO) network, a WiMax network or a WLAN.

APs 100 may also receive signals from one or more Earth orbiting Space Vehicles (SVs) 280-1 or 280-2 (collectively referred to as SVs 280), which may be part of a satellite positioning system (SPS). SVs 280, for example, may be in a constellation of Global Navigation Satellite System (GNSS) such as the US Global Positioning System (GPS), the European Galileo system, the Russian Glonass system or the Chinese Compass system. In accordance with certain aspects, the techniques presented herein are not restricted to global systems (e.g., GNSS) for SPS. For example, the techniques provided herein may be applied to or otherwise enabled for use in various regional systems, such as, e.g., Quasi-Zenith Satellite System (QZSS) over Japan, Indian Regional Navigational Satellite System (IRNSS) over India, and/or various augmentation systems (e.g., an Satellite Based Augmentation System (SBAS)) that may be associated with or otherwise enabled for use with one or more global and/or regional navigation satellite systems. By way of example but not limitation, an SBAS may include an augmentation system(s) that provides integrity information, differential corrections, etc., such as, e.g., Wide Area Augmentation System (WAAS), European Geostationary Navigation Overlay Service (EGNOS), Multi-functional Satellite Augmentation System (MSAS), GPS Aided Geo Augmented Navigation or GPS and Geo Augmented Navigation system (GAGAN), and/or the like. Thus, as used herein an SPS may include any combination of one or more global and/or regional navigation satellite systems and/or augmentation systems, and SPS signals may include SPS, SPS-like, and/or other signals associated with such one or more SPS. For example, AP 100 on vehicle 222 may determine a location based on SPS signals and/or characterize mobility based on SPS signals.

In some embodiments, AP 100 in a vehicle (e.g. vehicle 222, balloon 224, or airplane 226) may characterize mobility based on information received from a vehicular satellite positioning system to which the APs may be wirelessly coupled. Further, an AP 100 on a vehicle (e.g. car 222, balloon 224, or airplane 226) may serve as one or more of a WWAN/WLAN/WPAN access point and may also communicate with ground stations or satellite based communication systems. For example, AP 100 may communicate with another AP and/or a vehicle based system that communicates with ground stations or satellite based communication systems to provide network connectivity.

Figure 3A:
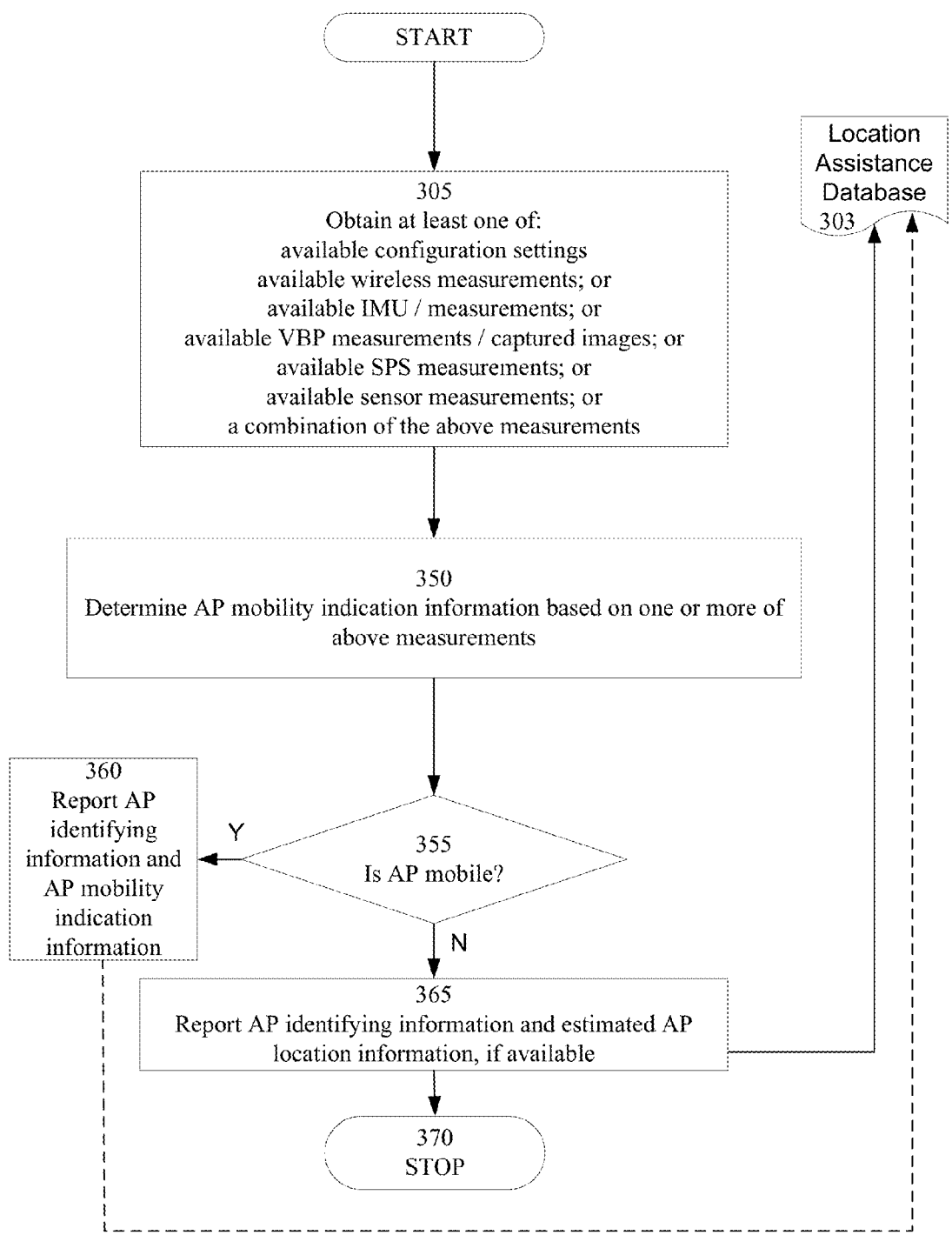
FIG. 3A shows an exemplary method 300 for AP mobility indication.

FIG. 3A shows an exemplary method 300 for AP mobility characterization. In some instances, method 300 may be implemented on an AP 100-$i$, where AP 100-$i$ may autonomously provide an indication of its own mobility. The term "self aware" as used herein refers to autonomous mobility characterization, by an AP 100-$i$, of its (AP 100-$i$) own mobility.

In some embodiments, method 300 may be implemented on AP 100/processor(s) 150, which may use configuration settings and/or measurements by one or more of SPS Receiver 140, camera(s) 180, sensor(s) 185, and/or IMU 170 to determine and/or characterize mobility of AP 100-$i$. In some embodiments, wireless signal measurements (e.g. WWAN, WLAN and/or WPAN) based on signals received by transceiver 100/receiver 114 may also be used to determine and/or provide mobility either independently, or in conjunction with available measurements from one or more of: SPS Receiver 140, camera(s) 180, sensor(s) 185 (e.g. altimeter, barometer etc), and/or IMU 170. In some embodiments, sensor measurements may be obtained concurrently, so one or more of blocks 305 through 345 may be performed in parallel.

In some embodiments, one or more steps in method 300 may be omitted based on the configuration, signal availability, and/or functionality available on AP 100-$i$. For example, for an AP 100-$i$ lacking one or more sensors, blocks associated with those sensors in method 300 may be omitted. In general, based on available sensors, one or more available measurements obtained in block 305, may be used in conjunction with block 350 to determine the mobility of AP 100-$i$.

In method 300, in block 305, in block 305, at least one of: (a) available configuration settings; or (b) available wireless measurements; or (c) available IMU/measurements; or (d) available VBP measurements/captured images; or (e) available SPS measurements; or (f) available sensor measurements; or (g) some combination of the above measurements may be obtained. Measurements are "available" when a corresponding sensor is present (e.g. AP 100-$i$ includes SPS receiver 140) and when signals are available for measurement by the corresponding sensor (e.g. SPS signals may be available outdoors, but not in some indoor environments).

For example, in block 305, available configuration settings on AP 100-$i$ may be read. For example, an AP may configured with configuration information pertaining to mobility. As one example, a manufacturer or a user may provide some mobility indication information as part of configuration information/configuration settings. For example, an AP outfitted on an aerial drone or another vehicle may be configured/pre-configured with configuration information to indicate that it is mobile and/or to indicate a range of displacement of the vehicle.

Figure 3B:
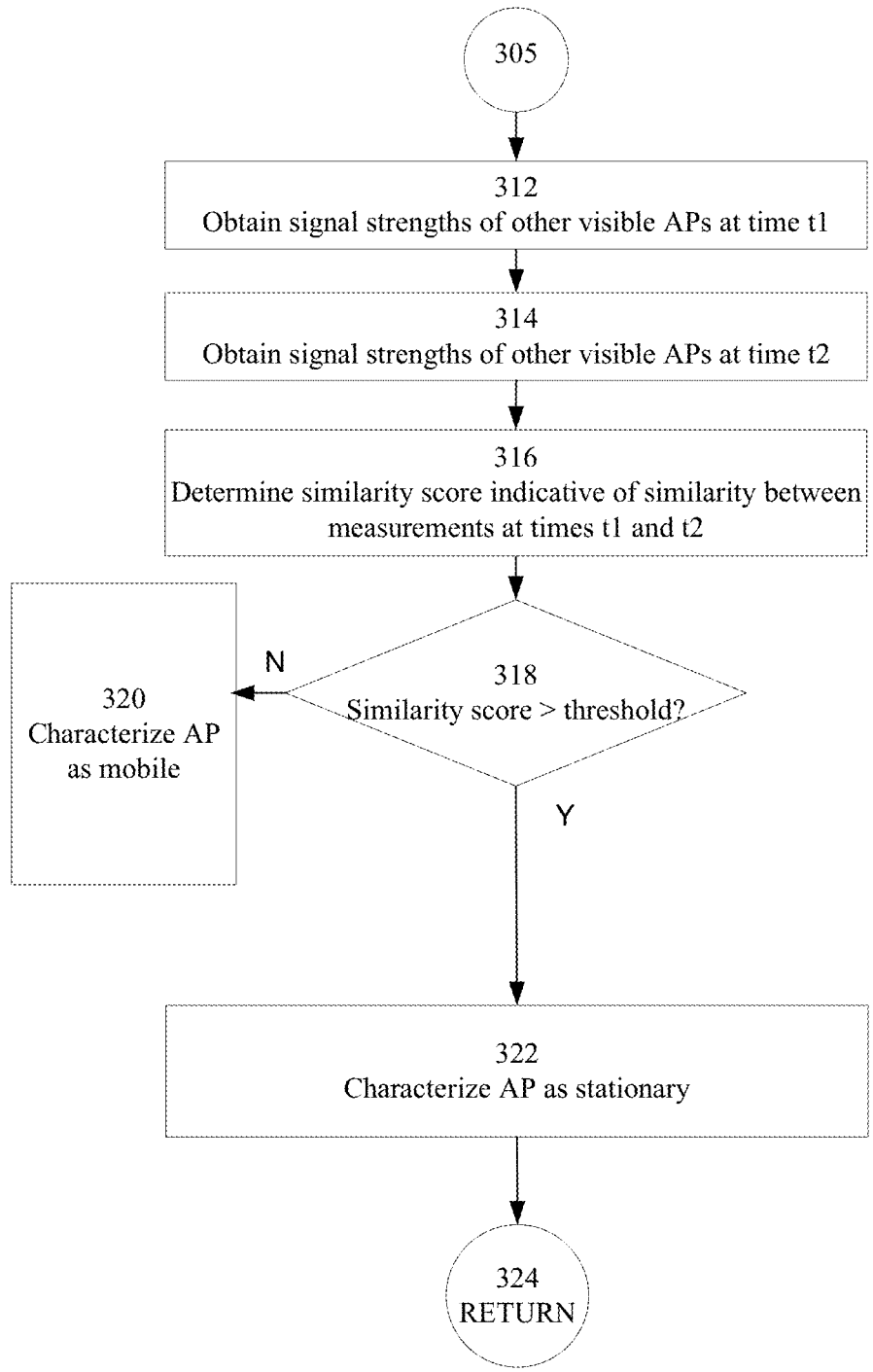
FIG. 3B shows an exemplary method 310 to determine AP mobility based on wireless measurements.

As another example, in block 305, available wireless signal measurements may be obtained over some time interval. Wireless signal measurements may include WWAN, WLAN and/or WPAN measurements. For example, AP 100-$i$ may determine network identifiers such as BSID, SID or NID, MAC address, BSSID, SSID, etc, received signal strengths, RTTs, etc from one or more neighboring/visible APs 100-$k$ ($k \neq i$) over some time interval or periodically. In some embodiments, the AP 100-$i$ may detect that it is mobile based on a change in neighbors APs 100-$k$ observed by AP 100-$i$ over some time period (e.g. as shown in FIG. 3B). Based on neighbor changes observed in some time interval, AP 100-$i$ may set a confidence interval or level pertaining to its mobility characterization. A larger change in neighbor APs 100-$k$ over a time period may be correlated to a higher confidence that the AP is mobile. In some embodiments, when the confidence level pertaining to mobility is below some confidence threshold, the AP 100-$i$ may be classified as stationary. The confidence threshold may be varied based on the degree of location accuracy desired in a system.

In some embodiments, in block 305, AP 100-$i$ may infer movement based on wireless coupling with a known mobile network such as a vehicle Bluetooth system, WLAN etc. FIG. 3B described below illustrates one example method of movement determination in block 305. For example, AP 100-$i$ may determine that it is mobile based on wireless coupling with a known navigation system on car 222, balloon 224 or airplane 226.

In some embodiments, in block 305, available measurements from IMU 170 may be obtained. For example, processor(s) 150 on AP 100-$i$ may obtain readings from IMU 170. In some embodiments, IMU measurements may be obtained periodically by processor(s) 150.

In some embodiments, in block 305, images captured by camera(s) 180 on AP 100-$i$ may be used to trigger VBP. In some embodiments, a plurality of images may be captured periodically, or at specified time intervals. For example, many augmented reality and/or virtual reality devices, which have cameras and/or image sensors, may serve as APs. The AP 100-$i$ may be determine that it is mobile, based on captured images over some time period. In some embodiments, VBP measurements may be determined and/or provided to AP 100-$i$. For example, AP 100-$i$ may process captured images (e.g. captured within some time interval of the current time) to determine a change in camera pose relative to a known fixed landmark.

In some embodiments, in block 305, available SPS measurements may be obtained. For example, SPS measurements may used to obtain a position, speed, and direction associated with movement of AP 100-*i*. In some embodiments, AP 100-*i* may obtain position, speed, and direction information from SPS receiver 140 and/or from a vehicle navigation system (e.g. on car 222, balloon 224 or airplane 226) to which it may be wirelessly coupled.

In some embodiments, in block 305, other available sensor measurements may be obtained. For example, information from barometers, altimeters, depth sensors, rangefinders or other sensors in sensor bank 185 may be obtained by processor(s) 150. For example, information provided by a barometer/altimeter may be used to determine altitude and/or variations altitude over a time period. Further, measurements by an IMU 170, or SPS information provided to AP 100 by systems on board the vehicle, may be used to determine location, speed, and/or direction of movement over the time period. Based on the altitude/altitude variations, speed/speed variations, direction of movement, and/or or other measurements above, the AP may determine that it is mounted on an aerial vehicle. The measurements may also identify the type of vehicle, e.g. balloon 224 or airplane/UAV/drone 226 based on speed (e.g. average, maximum, rate of change) altitude, and other characteristics. In some embodiments, the mobility characterization information for an AP may include information such as a vehicle or a vehicle type, within which an AP resides, or a vehicle or a vehicle type on which the AP may be mounted.

In some embodiments, in block 350, a determination of whether AP 100-*i* is mobile may be made. For example, processor(s) 150 may determine whether AP 100-*i* is mobile based on one or more of the measurements obtained in block 305. For example, processor(s) 150 may determine a position, speed, and/or direction based on measurements from IMU 170. In some embodiments, based on available measurements As another example, when using VBP, processor(s) 150 may estimate a pose of AP 100-*i* at one or more times based on the positions of known visual anchors and/or landmarks. If the pose of AP 100-*i* has changed between a pair of images relative to the landmarks or visual anchors, movement of AP 100-*i* may be inferred.

In some embodiments, in block 350, SPS measurements may directly indicate movement and also provide a speed and direction of movement of AP 100-*i*. Further, in block 350, measurements from sensors 185, such as information from rangefinders, depth sensors, ultrasonic transducers, etc may also be used to infer movement of AP 100-*i* based on displacement relative to one or more objects in the environment. In some embodiments, movement determination based on measurements in blocks 305, 330, 335, 340 and/or 345 may be weighted and a combined determination of the mobility of AP 100-*i* may be obtained based on the weights. In some embodiments, the weights may be determined based on an expected, likely, or historic reliability of measurements associated with sensors on AP 100-*i* and/or environmental conditions at the time of measurement.

In block 355, if AP 100-*i* is mobile ("Y" in block 355) then, in block 360, identifying information for AP 100-*i* along with an indication that AP 100-*i* is mobile may be reported to one or more network entities. For example, AP 100-*i* may report that it is mobile to one or more UEs 210 requesting location assistance, to devices attempting to connect to and/or connected to AP 100-*i*, to a location server coupled to AP 100-*i*, and/or another entity that provides location assistance, and/or to one or more APs 100-*k* (k≠i) in the vicinity of AP 100-*i* etc.

In some embodiments, when AP 100-*i* determines that it is mobile, AP 100-*i* may provide information to connecting devices, or cause the auto-configuration of devices that connect to AP 100-*i* to indicate that they are connected to a "public network." For example, many devices request user's to indicate whether a wireless network that the device connects to is a "home", "work" or "public" network at the time of connecting to an AP. In some embodiments, a bit may be set by mobile AP 100-*i* or an agreed upon protocol used, or a signal may be broadcast by the mobile AP to inform devices that connect to the mobile AP 100-*i* to auto-configure themselves as connected to a "public" network. In some embodiments, AP 100-*i* may also provide other mobility indication information at a time of reporting the mobility related information for AP 100-*i*. Further, in some embodiments, when a mobile phone or other known mobile device serves as an AP, the mobile phone/device may be auto-configured to automatically indicate that it is a mobile AP.

In some embodiments, a bit may be set and/or broadcast as part of identifying information for mobile AP 100-*i* and/or an agreed upon protocol used, and/or a signal may be broadcast by the mobile AP to 100-*i* inform other devices that receive the broadcast information that AP 100-*i* is mobile. In some embodiments, the mobility indication information or some subset of the mobility indication information broadcast by mobile AP 100-*i* may be available to all devices regardless of whether they are wirelessly connected to mobile AP 100-*i*. In some embodiments, the mobility information broadcast by mobile AP 100-*i* may be available to all devices that are authorized to connect and/or connected to mobile AP 100-*i*.

In some embodiments, upon receipt of information indicating that AP 100-*i* is mobile, the receiving entity (e.g. UE 210, and/or another AP 100-*k*, and/or location server 250 and/or another network entity) may: (i) delete AP 100-*i* from location assistance databases such as location assistance database 303 and/or almanacs (e.g. a base station almanac (BSA)) used to provide location assistance, if an entry for AP 100-*i* is present in location assistance database 303 or the BSA; or (ii) associate a location uncertainty with the location of AP 100-*i* in the BSA or location assistance database 303 or (iii) associate an entry with AP 100-*i* in the BSA to indicate that AP 100-*i* is mobile. In some embodiments, the location uncertainty may be a function of elapsed time measured from the most recent time that the location of mobile AP 100-*i* was determined, and/or a function of the speed at which mobile AP 100-*i* is moving and/or a determined based on the range of displacement of mobile AP 100-*i*. In some embodiments, location related information pertaining to a mobile AP 100-*i* may be deleted from the BSA or location assistance database 303 when the location uncertainty exceeds some threshold. For example, UEs 210 that receive an indication that AP 100-*i* is mobile may exclude the mobile AP when determining location. In some embodiments, where location assistance databases and/or BSAs are being built, updated, and/or maintained based on crowdsourced data, or when reporting AP positions to location servers for location assistance databases, a mobile AP 100-*i* may be excluded from such reporting. Thus, in some embodiments, location assistance databases may not include information for mobile APs 100-*i*, or may include an indication that the mobile AP 100-*i* is not to be used for location determination purposes.

In some embodiments, AP 100-*i* may set a bit, or otherwise broadcast that it is mobile. In some embodiments, a bit may be set in an identifier such as a SSID, BSID or other identifier broadcast by the AP to indicate mobility. For example, a protocol may be established, altered, or used between AP 100-*i* and other network devices to indicate if AP 100-*i* is mobile. In some embodiments, if an entry for AP 100-*i* exists in location assistance database 303, information associated with AP 100-*i* may be marked as unsuitable for use for location assistance. In some embodiments, if an entry for AP 100-*i* does not currently exist, then, based on the configuration of location assistance database 303, an entry for AP 100-*i* may not be created in location assistance database 303, so that location assistance database 303 will continue to not include information pertaining to AP 100.

In block 355, if AP 100-*i* is not mobile ("N" in block 355) then, in block 365, identifying information for AP 100-*i* along with location information may be reported to one or more network entities including other APs 100-*k* (k≠i), UEs and/or location servers. In some embodiments, information identifying AP 100-*i*, an estimated location of AP 100-*i*, and/or other information pertaining to AP 100-*i* may be stored in location assistance database 303. Method 300 may stop in block 370 once mobility characterization of AP 100-*i* is complete.

FIG. 3B shows exemplary method 310 to determine AP mobility based on wireless measurements. In some instances, method 310 may be invoked by block 305 when wireless measurements are available. In some embodiments, method 310 may be implemented on AP100-*i* to autonomously determine its (AP 100-*i*) own mobility.

In some embodiments, in block 312, AP 100-*i* may measure signal strengths of a first set of APs 100-*k* (k≠i) that are visible from, or in the vicinity of, AP 100-*i* at a time t1.

In some embodiments, in block 314, AP 100-*i* may measure signal strengths of a second set of APs 100-*k* (k≠i) that are visible from, or in the vicinity of, AP 100-*i* at a subsequent time t2 (t2>t1).

In block 316, a similarity measure indicative of the similarity between signal measurements for m common APs (i.e. APs that are visible at both times t1 and t2) in the first set and the second set may be determined based on the signal measurements at times t1 and t2. For example, a Tanimoto similarity measure indicative of the similarity between signal measurements for m common APs (i.e. APs that are visible at both times t1 and t2) in the first set and the second set may be determined based on the signal measurements at times t1 and t2. As one example, the similarity measure may be calculated as $$\text{Similarity}(S_{t1}, S_{t2}) = \frac{S_{t1} \cdot S_{t2}}{\|S_{t1}\|^2 + \|S_{t2}\|^2 - (S_{t1} \cdot S_{t2})} \quad (1)$$

If there are m APs 100 visible at times t1 and t2, then, $S_{t1} = \{s\_1_{t1}, s\_2_{t1}, \ldots s\_m_{t1}\}$ is the ordered set (vector) of signal strengths of the m APs 100-1, 100-2, … 100-*m* visible at time t1 and $S_{t1} = \{s\_1_{t2}, s\_2_{t2}, \ldots s\_m_{t2}\}$ is the ordered set (vector) of signal strengths of the same m APs 100-1, 100-2, … 100-*m* visible at time t2, "•" represents the dot product (of the ordered set of signal strengths, "$\| \|^2$", represents the sum of the squares of the magnitudes (of the ordered set of signal strengths), $s\_k_{t1}$ is the signal strength corresponding to AP 100-*k* at time t1, $s\_k_{t2}$ is the signal strength corresponding to AP 100-*k* at time t2, and k=1 … m. In general, various other measures of similarity between data sets may be used.

In some embodiments, in block 318, if the similarity score computed in equation (1) above exceeds a threshold ("Y" in block 318), then, in block 322, AP 100-*i* may determine that it is stationary. On the other hand, in block 318, if the similarity score computed in equation (1) above does not exceed the threshold ("N" in block 318), then, in block 320, AP 100-*i* may determine that it is mobile. The threshold may be varied based on the degree of movement of AP 100-*i* desired to be detected. A larger threshold may be used to detect small movements of AP 100-*i*, while a lower threshold may be used if larger movements of AP 100-*i* are to be detected and smaller movements ignored. In block 324, control may be returned to the calling routine (e.g. method 300).

Figure 4:
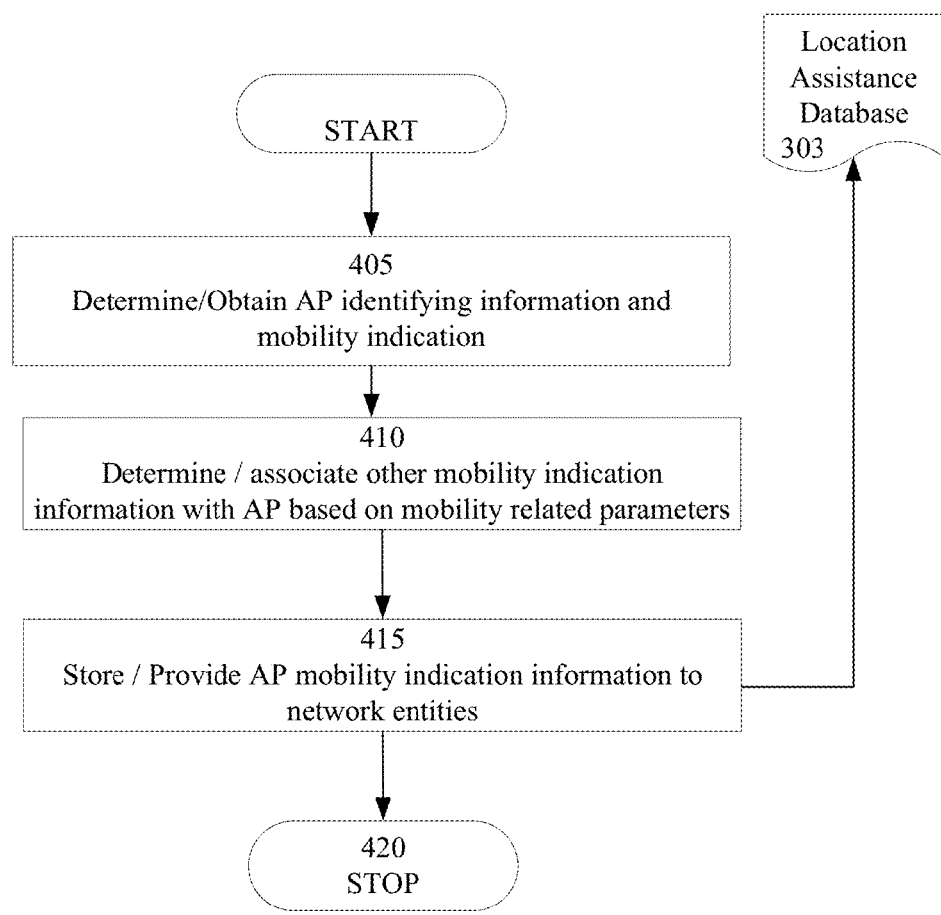
FIG. 4 shows a flowchart of an exemplary method 400 to provide mobility indication information for a mobile AP 100-*i* to network entities and/or update location assistance data related to AP 100-*i*.

FIG. 4 shows a flowchart of an exemplary method 400 to provide mobility indication information for a mobile AP 100-*i* to various entities communicatively coupled to a mobile AP 100-*i* and/or to update location assistance data related to AP 100-*i*. In some embodiments, method 400 may be performed by a mobile AP 100-*i* and/or a server 250 and/or another entity communicatively coupled to mobile AP 100-*i* or some combination thereof.

In block 405, identifying information for mobile AP 100-*i* and mobility indication information for mobile AP 100-*i* may be determined and/or obtained. For example, mobile AP 100-*i* may invoke method 300 to obtain an indication of its mobility. The mobility indication may include information about whether the AP is mobile. When method 400 is implemented on location server 250, in block 405, identification and mobility indication information for AP 100-*i* may be obtained from mobile AP 100-*i*. For example, a BSID, SID or NID, MAC address, BSSID, SSID, etc, may be obtained and used as identifying information for mobile AP 100-*i*.

In some embodiments, in block 410, other mobility indication information may be determined and/or associated with identification information for mobile AP 100-*i*. For example, depending on availability, the mobility indication information may include one or more of: (i) a time at which the mobility indication was determined; (ii) a current location of the device; (iii) information related to a range of displacement of the AP, (iv) information related to a speed and/or a direction of movement of the AP, (v) information related to one or more time periods during which the AP is mobile, (vi) location uncertainty information associated with the AP, (vi) information related to use of the AP (and/or any provided mobility indication information) for location determination purposes, (vi) a period of validity or an expiry time for the mobility indication information, and/or (vii) vehicle related information, such as a vehicle or a vehicle type (e.g. car, train drone, balloon, etc.), with which a mobile AP may be associated. For example, the mobility characterization information may include information about a vehicle within which an AP resides, or a vehicle or a vehicle type on which the AP may be mounted. The above mobility related information may be associated with the identifier for mobile AP 100-*i*.

In some embodiments, in block 415, mobility indication information for mobile AP 100-*i* may be associated with an identifier for AP 100-*i* and stored in location assistance database 303. In some embodiments, the location assistance database may reside on AP 100-*i*, be accessible to AP 100-*i*, and/or on server 250 and/or another entity communicatively coupled to AP 100-*i*. In some embodiments, in block 415, the location, location uncertainty information, and other mobility related information for mobile AP 100-*i* may be provided by AP 100-*i* to UEs 210, to servers 230, and/or to other APs 100-*k* (k≠i).

Figure 5A:
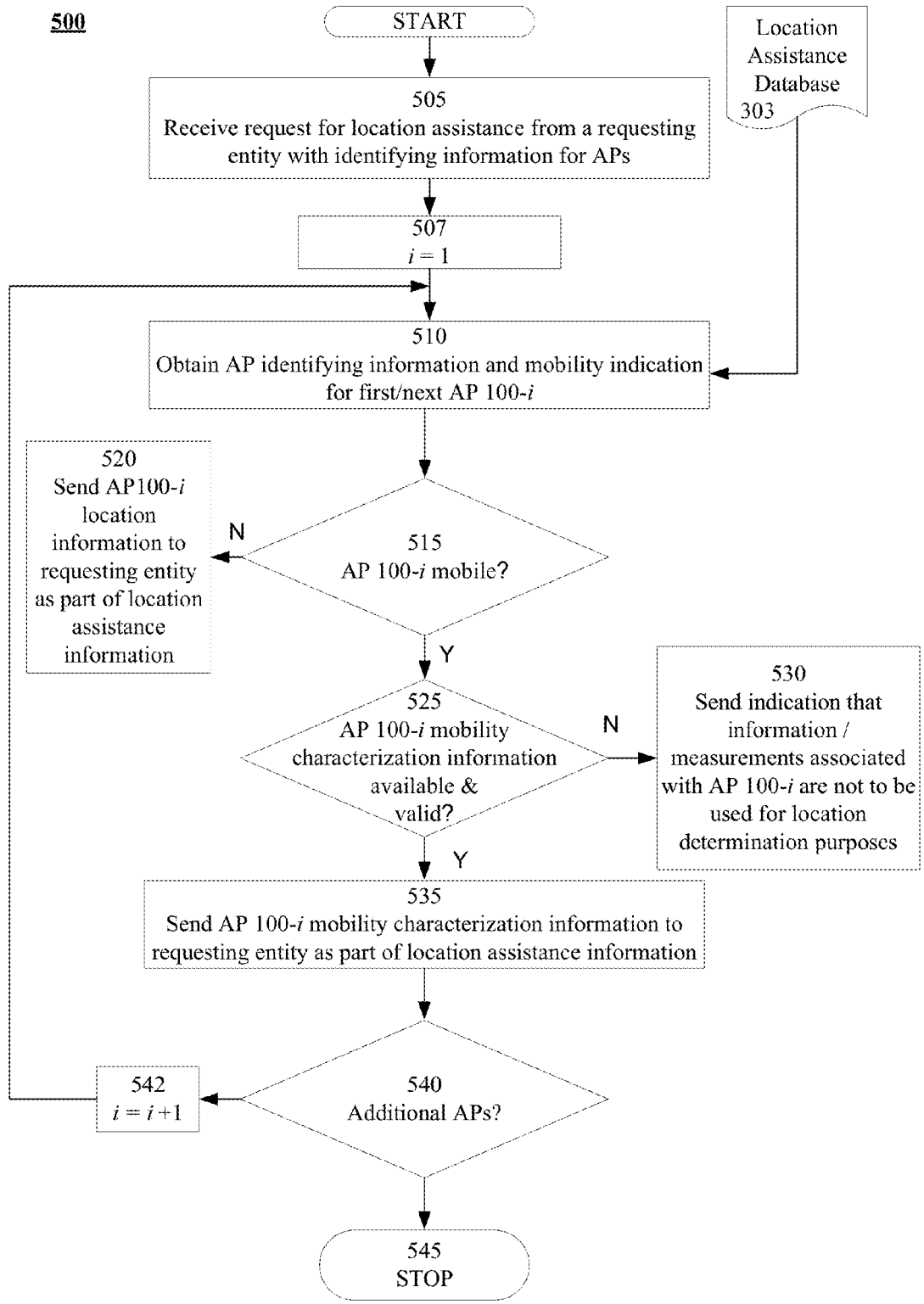
FIG. 5A shows a flowchart for an exemplary method 500 for providing location assistance information in a system comprising APs 100-*i*, which may include one or more mobile APs.

FIG. 5A shows a flowchart for an exemplary method 500 for providing location assistance information in a system comprising APs 100-*i*, which may include one or more mobile APs. In some embodiments, method 500 may be performed by a server 250 and/or another entity coupled to the requesting entity (e.g. devices/UEs 210) requesting location assistance information.

In some embodiments, in block 505, a request for location assistance data may be received from a requesting entity, where the request includes identification information for one or more APs 100-*i*, 1≤i≤N, where N is the number of APs identified in the request. For example, a requesting entity such as a UE 210 and/or another device may request location assistance data and provide identification information for one or more APs 100-*i* that are visible to the requesting entity as part of the location assistance request. For example, the location assistance request may be received by location assistance server 230 from UE 210-1. In block 507, a counter i may be initialized to 1, In some embodiments, in block 510, location assistance database 303 may be queried to obtain location assistance information for a first/next APs 100-*i* identified in the location assistance request.

In some embodiments, in block 515, based on the information retrieved from location assistance database 303, a determination of whether AP 100-*i* is mobile may be made. If AP 100-*i* is not mobile ("N" in block 515), then in block 520, location assistance information pertaining to AP 100-*i*, which may include location information for AP 100-*i* may be sent to the requesting entity.

If AP 100-*i* is mobile ("Y" in block 515), then in block 525, it may be determined if mobility indication information for AP 100-*i* is available and valid.

If no entry exists for AP 100-*i* in location assistance database 303, or if information about AP100-*i* exists but is no longer valid ("N" in block 525), then, in block 530, an indication that AP 100-*i* is not to be used for location determination purposes may be sent to the requesting entity. For example, location information pertaining to mobile AP 100-*i* may exceed some location uncertainty threshold and/or a validity period associated with the location information pertaining to a mobile AP 100-*i* may have expired. In the example above, an indication that AP 100-*i* is not to be used for location determination purposes may be sent to the requesting entity.

In some embodiments, if an entry exists for AP 100-*i* in location assistance database 303 and if information about AP100-*i* is valid ("Y" in block 525), then, in block 535, mobility indication information for AP 100-*i* may be sent to the requesting entity. For example, the mobility indication information may include a location estimate of mobile AP 100-*i*, a location uncertainty associated with the location of AP 100-*i*, a speed and/or a direction of travel of mobile AP 100-*i*, and a time at which the measurements/mobility indication was obtained. In some embodiments, the mobility indication information may include a period of validity or a time of expiry for the mobility indication information associated with mobile AP 100-*i*.

In block 540, it may be determined whether there are additional APs. For example, the current value of i may be compared with N. If there are additional APs to be processed ("Y" in block 540), then, in block 542, the counter i is incremented and another iteration is commenced in block 510. If there are no further APs ("N" in block 540), then, the method may terminate in block 545.

Figure 5B:
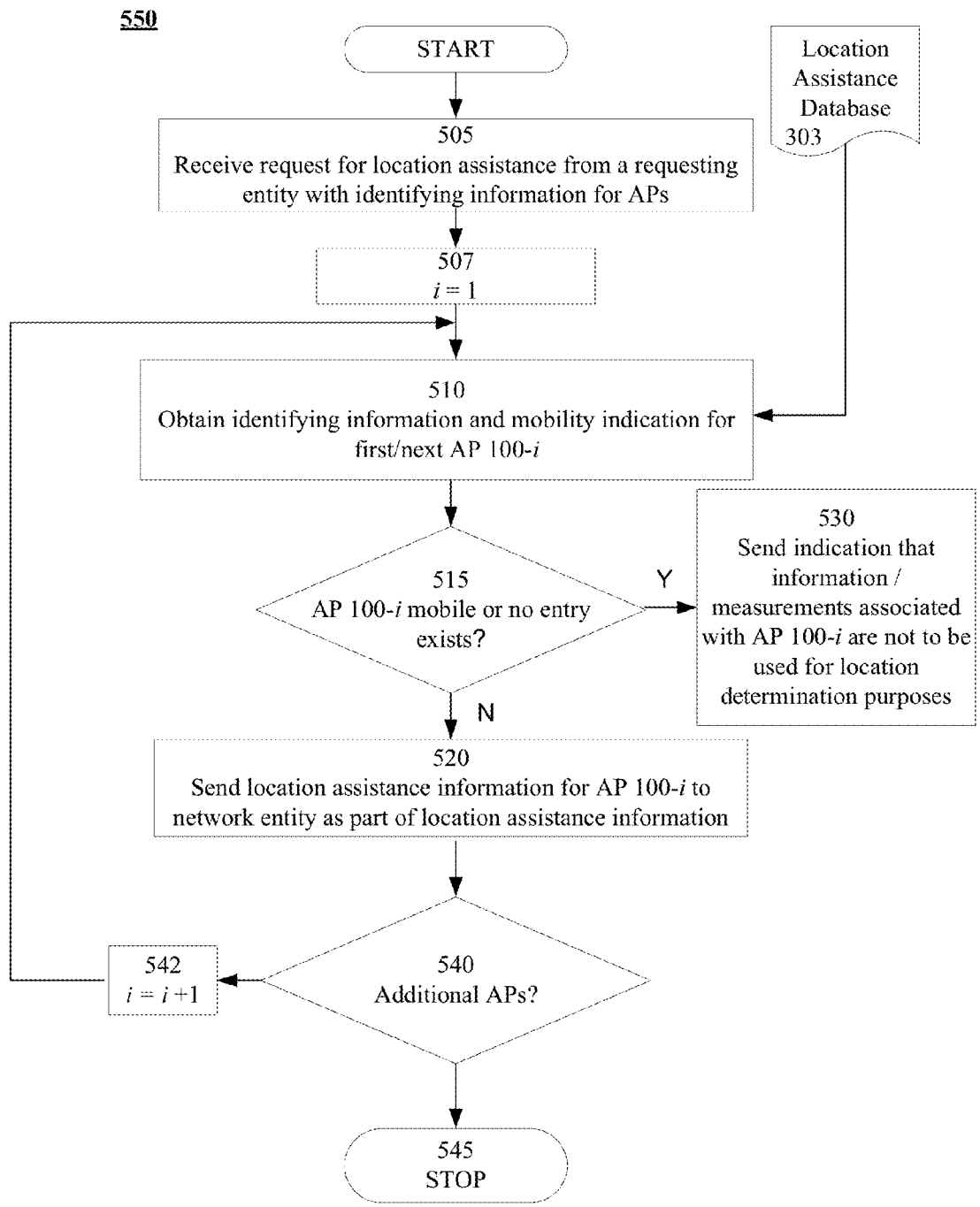
FIG. 5B shows a flowchart for another exemplary method 550 for providing location assistance information in a system comprising APs 100-*i*, which may include one or more mobile APs.

FIG. 5B shows a flowchart for another exemplary method 550 for providing location assistance information in a system comprising APs 100-*i*, which may include one or more mobile APs. In some embodiments, method 550 may be performed by a server 250 or another entity communicatively coupled to a requesting entity (e.g. UE 210 and/or another device) requesting location assistance information.

In some embodiments, in block 505, a request for location assistance data may be received, where the request includes identification information for one or more APs 100-*i*, 1≤i≤N, where N is the number of APs identified in the request. For example, a requesting entity such as UE 210 and/or another device may request location assistance data and provide identification information for one APs 100-*i* that are visible to the requesting entity as part of the location assistance request. The location assistance request from the requesting entity may be received by location assistance server 230. In block 507, a counter i may be initialized to 1.

In some embodiments, in block 510, location assistance database 303 may be queried to obtain location assistance information for a first/next APs 100-*i* identified in the location assistance request.

In some embodiments, in block 515, based on the information retrieved from location assistance database 303, a determination of whether AP 100-*i* is mobile may be made.

If an entry for AP 100-*i* exists and AP 100-*i* is not mobile ("N" in block 515), then in block 520, location assistance information pertaining to AP 100-*i*, which may include location information for AP 100-*i* may be sent to the requesting entity.

If no entry for AP 100-*i* exists in location assistance database 303, or AP 100-*i* is mobile ("Y" in block 515), then in block 530, an indication that AP 100-*i* is not to be used for location determination purposes may be sent to the requesting entity.

In block 540, it may be determined whether there are additional APs. For example, the current value of i may be compared with N. If there are additional APs to be processed ("Y" in block 540), then, in block 542, the counter i is incremented and another iteration is commenced in block 510. If there are no further APs ("N" in block 540), then, the method may terminate in block 545.

Although, in FIGS. 5A and 5B, location assistance information is shown as being transmitted individually for each AP 100-*i*, it is envisaged that the location assistance information may be transmitted as a single block of information with information pertaining to one or more APs identified in the location assistance request. In some embodiments, the location assistance information may be transmitted in accordance with any prevailing protocol for the transmission of the location assistance information.

Figure 6:
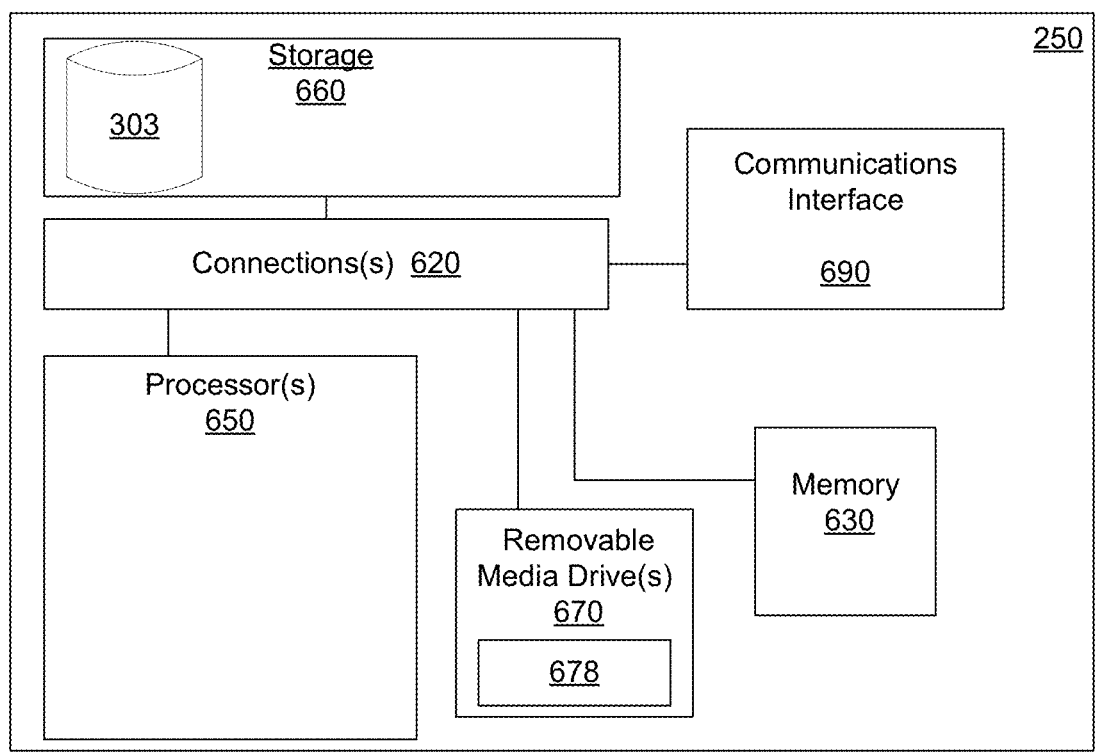
FIG. 6 shows a schematic block diagram illustrating a server 250 to aggregate AP information and to provide location assistance information in an environment including mobile APs in accordance with certain embodiments presented herein.

Reference is now made to FIG. 6, which is a schematic block diagram illustrating a server 250 to aggregate AP information and provide location assistance information in an environment including mobile APs. In some embodiments, the information aggregated by server 250, for example, in exemplary location assistance database 303, may be crowdsourced. For example, the information may be provided APs 100, UEs 210 and/or other devices coupled to server 250 over network 230.

In some embodiments, server 250 may include, for example, one or more processors 650, memory 630, storage 660, and (as applicable) communications interface 690 (e.g., wireline or wireless network interface), which may be operatively coupled with one or more connections 620 (e.g., buses, lines, fibers, links, etc.). In certain example implementations, some portion of server 250 may take the form of a chipset, and/or the like.

Communications interface 690 may include a variety of wired and wireless connections that support wired transmission and/or reception and, if desired, may additionally or alternatively support transmission and reception of one or more signals over one or more types of wireless communication networks. Communications interface 690 may also include interfaces for communication with various other computers and peripherals. For example, in one embodiment, communications interface 690 may comprise network interface cards, input-output cards, chips and/or ASICs that implement one or more of the communication functions performed by server 250. In some embodiments, communications interface 690 may also interface with networks 230 (not shown in FIG. 6) to obtain a variety of network configuration related information, such as SSIDs BSSIDs, Physical Cell Identities, (PCIs), network identifiers and/or timing information used by the base stations in the network. For example, communications interface 690 may make use of the LPP annex (LPPa) protocol defined in 3GPP TS 36.455 or a modification of this protocol to obtain PCI, configured PRS, timing and/or other information from the base stations in network 230. Processor(s) 650 may use some or all of the received information to generate OTDOA and other location assistance data information in a manner consistent with disclosed embodiments.

Processor(s) 650 may be implemented using a combination of hardware, firmware, and software. Processor(s) 650 may use received AP measurements and other information (e.g. provided by AP 100 communicatively coupled to server 250) to derive location assistance information. For example, APs 100 may provide location information, mobility indication (including whether AP 100-*i* is mobile and/or a location of the AP 100-*i* and/or a speed and direction of movement of AP 100-*i* (if mobile), and/or measurements by sensors on AP 100-*i* along with AP identification information to server 250.

Server 250 may derive mobility indication information for APs 100 from the mobility indication information and/or from the measurements provided by APs 100. information. For example, location uncertainty information may be determined based, in part, on the speed of movement of the AP, range, and/or the elapsed time from the last measurement. In some embodiments, APs 100 may provide the mobility indication information to server 250, which may receive the mobility indication information, associate the mobility indication information with the transmitting AP 100-*i*, and store the mobility indication information in location assistance database 303. Server 250 may also aggregate information related to one or more APs 100 prior to storing the information in location assistance database 303 and/or BSA. In some embodiments, server 250 may provide the information in location assistance database 303 in response to a location assistance request received from UEs 210. For example, server may indicate that an AP 100 is mobile and should not be used for location assistance and/or provide a location uncertainty associated with the location of the AP.

The elements and methodologies described herein in may be implemented by various means depending upon the application. For example, these elements and methodologies may be implemented in hardware, firmware, software, or any combination thereof. For a hardware implementation, the processor(s) 650 may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof.

For a firmware and/or software implementation, the methodologies may be implemented using procedures, functions, and so on that perform the functions described herein. Any machine-readable medium tangibly embodying instructions may be used in implementing the methodologies described herein. For example, software may be stored in removable media drive 670, which may support the use of non-transitory computer-readable media 678, including removable media. Program code may be resident on non-transitory computer readable media 678 or memory 630 and may be read and executed by processors 650. Memory 630 may be implemented within processors 650 or external to the processors 650. As used herein the term "memory" refers to any type of long term, short term, volatile, nonvolatile, or other memory and is not to be limited to any particular type of memory or number of memories, or type of media upon which memory is stored.

If implemented in firmware and/or software, the functions may be stored as one or more instructions or code on a non-transitory computer-readable medium 678 and/or memory 630. Examples include computer-readable media encoded with a data structure and computer-readable media encoded with a computer program. For example, non-transitory computer-readable medium 678 including program code stored thereon may include program code to support proxy device usage in a manner consistent with disclosed embodiments.

Non-transitory computer-readable media includes a variety of physical computer storage media. A storage medium may be any available medium that can be accessed by a computer. By way of example, and not limitation, such non-transitory computer-readable media can comprise RAM, ROM, EEPROM, CD-ROM or other optical disk storage, magnetic disk storage or other magnetic storage devices, or any other medium that can be used to store desired program code in the form of instructions or data structures and that can be accessed by a computer; disk and disc, as used herein, includes compact disc (CD), laser disc, optical disc, digital versatile disc (DVD), floppy disk and blu-ray disc where disks usually reproduce data magnetically, while discs reproduce data optically with lasers. Other embodiments of non-transitory computer readable media include flash drives, USB drives, solid state drives, memory cards, etc. Combinations of the above should also be included within the scope of computer-readable media.

In addition to storage on computer readable medium, instructions and/or data may be provided as signals on transmission media to communications interface 690, which may store the instructions/data in memory 630, storage 660 and/or relayed the instructions/data to processors 650 for execution. For example, communications interface 690 may receive wireless or network signals indicative of instructions and data. The instructions and data are configured to cause one or more processors to implement the functions outlined in the claims. That is, the communication apparatus includes transmission media with signals indicative of information to perform disclosed functions.

Memory 630 may represent any data storage mechanism. Memory 630 may include, for example, a primary memory and/or a secondary memory. Primary memory may include, for example, a random access memory, read only memory, non-volatile RAM, etc. While illustrated in this example as being separate from processing unit 650, it should be understood that all or part of a primary memory may be provided within or otherwise co-located/coupled with processing unit 650. Secondary memory may include, for example, the same or similar type of memory as primary memory and/or storage 660 such as one or more data storage devices including, for example, hard disk drives, optical disc drives, tape drives, a solid state memory drive, etc. In some embodiments, storage 660 may comprise one or more databases that may hold information pertaining to various entities in system 200 and/or the broader cellular network. In some embodiments, information in the databases may be read, used and/or updated by processors 650 during various computations, including storing, updating, and/or generating location assistance data, etc.

In certain implementations, secondary memory may be operatively receptive of, or otherwise configurable to couple to a non-transitory computer-readable medium 678. As such, in certain example implementations, the methods and/or apparatuses presented herein may take the form in whole or part of a removable media drive 670 that may include non-transitory computer readable medium 678 with computer implementable instructions stored thereon, which if executed by at least one processing unit 650 may be operatively enabled to perform all or portions of the example operations including methods 300, 305, 400, 500, and/or 550 in a manner consistent with embodiments described herein. Computer readable medium 678 may be a part of memory 630.

FIG. 7 shows a flowchart of an exemplary method 700 to determine mobility indication information for an AP. In some embodiments, method 700 may be performed by a first AP 100-$i$.

In some embodiments, in block 710, mobility indication information for AP 100-$i$, may be determined based, in part, on at least one of: configuration information on a first AP 100-$i$ pertaining to mobility of the AP 100-$i$; or wireless signal measurements associated with the AP 100-$i$, or captured images associated with AP 100-$i$, or sensor measurements associated with AP 100-$i$; or any combinations of the above thereof.

For example, AP 100-$i$ may have factory settings, and/or be configured by a manufacturer or a user with mobility indication information. As one example, AP 100-$i$ outfitted on an aerial drone or another vehicle may be configured/pre-configured to indicate that it is mobile. In some embodiments, the wireless signal measurements associated with t AP 100-$i$ may be determined by AP 100-$i$ (e.g. using transceiver 110).

In some embodiments, captured images associated with the first AP may be captured by a camera coupled to AP 100-$i$. As one example, the camera may form part of AP 100-$i$. As another example, the camera may be coupled to a device or vehicle (e.g. a drone or other vehicle) on which t AP 100-$i$ is mounted and the captured images may be provided to AP 100-$i$.

In some embodiments, sensor measurements associated with AP 100-$i$ may be obtained by sensors coupled to AP 100-$i$. As one example, the sensor may form part of AP 100-$i$. As another example, the sensors may be coupled to a device or vehicle (e.g. a balloon or other vehicle) on which t AP 100-$i$ is mounted and the sensor measurements may be provided to AP 100-$i$.

In some embodiments, the mobility indication information of AP 100-$i$, may be determined based, in part, on the wireless signal measurements by: determining a similarity score based on first wireless signal strength measurements at a first time (t1) for a set of second APs (e.g. APs 100-$k$, k≠i) and second wireless signal strength measurements at a second time (t2) for the set of second APs; and determining that AP 100-$i$ is mobile when the similarity score is below a threshold. In some embodiments, a Tanimoto similarity score may be used as the similarity score.

In some embodiments, sensors coupled to the first AP 100-$i$ may comprise one or more of a barometer and/or an altimeter, and/or IMU 170 and the mobility indication information for AP 100-$i$ may be determined based, in part, on measurements by the above sensors by: determining an altitude based on measurements by the barometer and/or the altimeter, and/or determining a speed of AP 100-$i$ and a direction of movement of AP 100-$i$ based on measurements by IMU 170. Further, in some embodiments, based on the altitude of AP 100-$i$, and/or the speed of AP 100-$i$, and/or the direction of movement of AP 100-$i$, a vehicle type associated with AP 100-$i$ may be determined; and one or more of: the altitude of AP 100-$i$, and/or the speed of AP 100-$i$, and/or the direction of movement of AP 100-$i$, and/or the vehicle type, may be associated with the mobility indication information for the AP 100-$i$. For example, based on altitude and/or speed, AP 100-$i$ may be determined to be on an airplane (vehicle type) (e.g. high altitude and high speed). As another example, based on altitude and/or speed, AP 100-$i$ may be determined to be on a balloon (high altitude and lower speed). As a further example, based on altitude and/or speed, and/or a direction of movement and/or a current location, AP 100-$i$ may be determined to be on a car or a train.

In some embodiments, the mobility indication information of AP 100-$i$, may be determined based, in part, on the wireless signal measurements by determining, based, in part, on the wireless signal measurements, that AP 100-$i$ is associated with a vehicular navigation system. Further, based on information from the vehicular navigation system an altitude of AP 100-$i$, a speed of AP 100-$i$, a direction of movement of AP 100-$i$ and/or a vehicle type associated with AP 100-$i$ may be determined. In embodiments where a vehicle type is not determinable directly from information provided by the vehicle navigation system, the vehicle type may be determined as outlined above based on the altitude of AP 100-$i$, the speed of AP 100-$i$, and the direction of movement of AP 100-$i$. Further, one or more of: the altitude of AP 100-$i$, and/or the speed of AP 100-$i$, and/or the direction of movement of the AP 100-$i$, and/or the vehicle type, may be associated with the mobility indication information for the AP 100-$i$. For example, based on the information acquired from the vehicular navigation system and/or sensor measurements, the vehicle type may be determined as one of airplane, balloon, car, train, boat, etc.

In block 720, the mobility indication information for AP 100-$i$ may be transmitted. In some embodiments, the mobility indication information for AP 100-$i$ may indicate whether AP 100-$i$ is mobile. In some embodiments, the mobility indication information may be transmitted to one or more of: a location server communicatively coupled to AP 100-$i$; and/or one or more second APs communicatively coupled to AP 100-$i$; or one or more User Equipments (UEs) communicatively coupled to AP 100-$i$.

In some embodiments, the mobility indication information for AP 100-$i$ may comprise information indicating that AP 100-$i$ is mobile and is not suitable for location determination purposes. In some embodiments, the mobility indication information for AP 100-$i$ may comprise information indicating that AP 100-$i$ is mobile and may further include a request to remove location related information associated with AP 100-$i$ from one or more of: location determination databases, and/or location assistance databases (e.g. location assistance database 303), and/or base station almanacs.

In some embodiments, the mobility indication information for AP 100-*i* may comprise information may comprise one or more of: an indication of a range over which displacement of the first AP occurs; or a pattern of movement associated with AP 100-*i*; one or more time periods over which AP 100-*i* is mobile; or a location information associated with a current location of AP 100-*i*; or a location uncertainty information associated with the current location of AP 100-*i*; or a speed of movement of AP 100-*i*; or a direction of movement of AP 100-*i*; or a time of expiry for the mobility indication information for AP 100-*i*, or a vehicle or vehicle type associated with AP 100-*i*. For example, a pattern of movement may be determined for AP 100-*i* on a vehicle whose movements are known in advance or predictable. As one example, a pattern of movement may be determined for a public bus or train between locations that operates on a timetable or a schedule.

In some embodiments, method 700 may further comprise providing an indication of mobility in an identifier broadcast by AP 100-*i*.

Figure 8:
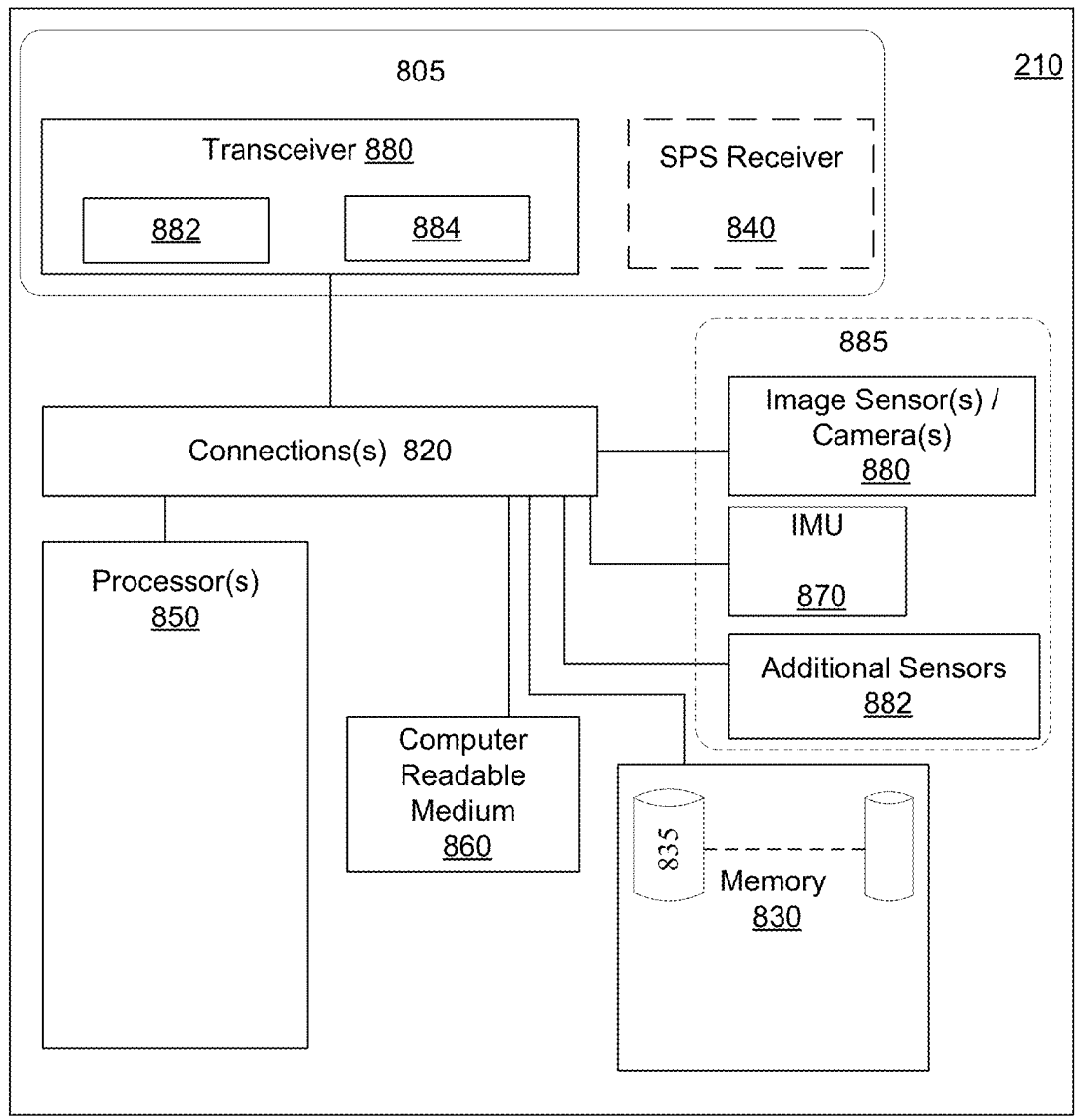
FIG. 8 shows a schematic block diagram illustrating certain exemplary features of UE 210.

FIG. 8 shows a schematic block diagram illustrating certain exemplary features of UE 210. UE 210 may take the form of mobile station, cellular phone, or a computing device such as a wearable device, laptop, handheld, tablet etc, or another entity coupled to a wireless network.

UE 210 may include one or more processing units or processor(s) 850 and memory 830. Processor(s) 850 may be implemented using a combination of hardware, firmware, and software. UE 210 may also include a wireless network interface 805. UE 210 may further comprise computer-readable medium 860. Functional components on UE 210 may be operatively coupled to each other with one or more connections 820 (e.g., buses, lines, fibers, links, etc.). In certain example implementations, all or part of UE 210 may take the form of a chipset, and/or the like.

In some embodiments, wireless network interface may include transmitter 812 and receiver 814. Transceiver 810 may, for example, include a transmitter 812 enabled to transmit one or more signals over one or more types of wireless communication networks and a receiver 814 to receive one or more signals transmitted over one or more types of wireless communication networks.

In some embodiments, UE 210/wireless network interface 805 may receive wireless signals from one or more APs 100. In some embodiments, the wireless signals received by UE 210 may include an identifier associated with the AP 100-*i* transmitting the wireless signals and mobility indication information associated with the AP 100-*i* transmitting the wireless signals. In some embodiments, UE 210/processor 850 may determine that the AP is mobile based on the received mobility indication information associated with the AP; and determine, based on the received mobility indication information associated with the AP, a suitability of the AP for determining a location of UE 210. In some embodiments, the mobility indication information may be provided to UE 210 as location assistance information using any appropriate protocol.

At locations where SPS signals are available, UE 210 may determine its position and/or mobility using GNSS/Satellite Positioning System (SPS) based positioning. As another example, when WWAN/WLAN signals are available one of: OTDOA, RSTD, AFLT, hybrid SPS-AFLT techniques, RTT, RSSI, etc. may be used to determine a location of UE 210. In some embodiments, hybrid IMU-wireless techniques, and/or VBP may be used to estimate a location of UE 210 and/or determine that UE 210 is mobile.

In some embodiments, when UE 210 determines its location, wireless signal measurements from one or more APs 100 may be excluded based on received mobility indication information. For example, the received mobility indication information may indicate that an AP 100-*i* is mobile. Based on the received mobility indication information, UE 210 may exclude AP 100-*i* when performing one or more of the above location determination methods to determine the location of UE 210.

In some embodiments, UE 210 may delete records associated with mobile APs 100 that may be stored in memory 830 and/or databases 835. For example, databases 835 may comprise location related databases or almanacs including location information for one or more APs 100. As another example, records associated with mobile APs 100 in memory 830/databases 835 may be updated and APs may be associated with corresponding received mobility indication information for the AP. For example, a record may be created or updated associating the mobility indication information for an AP with the AP identifier. The mobility indication information may comprise one or more of: an indication of a range over which displacement of the AP occurs; or a pattern of movement associated with the AP; or one or more time periods over which the AP is mobile; or a location information associated with a current location of the AP; or a location uncertainty information associated with the current location of the AP; or a speed of movement of the AP; or a direction of movement of the AP; or a time of expiry for the mobility indication information for the AP, or a vehicle or vehicle type associated with the AP. In some embodiments, UE 210/processor(s) may determine the location of UE 210 by utilizing the mobility indication information associated with the AP. For example, location uncertainty information associated with the current location of the AP may be used weight measurements of wireless signals received from the AP when a location of UE 210 is determined. In some embodiments, processor(s) 850 may communicate or initiate communication of received AP mobility indication information to a server (e.g. a location server) or another entity communicatively coupled to UE 210.

In some embodiments, UE 210 may also serve as an access point. For example, UE may serve as an access point in an ad-hoc network or a P2P network. In instances where UE 210 serves as an access point, UE may be auto-configured to indicate that it is mobile and broadcast mobility indication information indicative of the mobility of UE 210. For example, configuration information in memory 830 may cause UE 210 to broadcast mobility indication information indicative of the mobility of UE 210. Thus, in some embodiments, UE 210 may be a client connected to one or more first APs 100, while simultaneously serving as an access point to other devices. For example, UE 210 may serve as an access point to one or more tethered devices.

In some embodiments, UE 210/wireless network interface 805 may optionally include Global Navigation Satellite System (GNSS) or Satellite Positioning System (SPS) receiver 840. In some embodiments, optional SPS receiver 840 may be enabled to receive signals associated with one or more SPS/GNSS resources. Received GNSS signals may be used to determine a position and/or velocity (speed and direction of movement) of UE 210. In instances where UE 210 serves as an access point, information such as position and/or velocity (speed and direction of movement) of UE 210 and/or other information obtained by SPS receiver 840 may be provided as part of mobility indication information for UE 210.

In some embodiments, UE 210 may optionally comprise image sensors such as CCD or CMOS sensors and/or camera(s) 880, which are hereinafter referred to as "camera(s) 880". Camera(s) 880 may convert an optical image into an electronic or digital image and may send captured images to processor(s) 850. Camera(s) 880, which may be still and/or video cameras, may capture a series of 2-Dimensional (2D) still and/or video image frames of an environment and send the captured image frames to processor(s) 850. In some embodiments, for example, when UE 210 is embodied in a wearable device, camera(s) 880 may take the form of a wearable camera, or an external camera, which may be operationally coupled to, but housed separately from, other functional units in UE 210.

In some embodiments, images captured by camera(s) 880 may be used to determine that UE 210 is mobile. For example, images captured by camera(s) 880 may be used to trigger Vision Based Positioning (VBP). For example, an image of a landmark or point of interest captured by camera(s) 880 in the vicinity of UE 210 may be used to determine a location of UE 210. Mobility may be determined based on location changes determined using VBP techniques. In some embodiments, a 6 Degrees of Freedom (6DoF) pose of the AP may be determined using Visual Simultaneous Localization and Mapping (VSLAM) based on feature points in images and movement may be determined based on pose changes relative to some landmark or feature. In some embodiments, visual odometry techniques may be used to determine movement. The visual or image based techniques above may be used independently and/or in conjunction with input from other sensors such as Inertial Measurement Unit 870, SPS receiver 840, etc. In instances where UE 210 serves as an access point, VBP based information, such as a position of UE 210, may be provided as part of mobility indication information for UE 210.

In some embodiments, UE 210 may optionally include Inertial Measurement Unit (IMU) 870. IMU 870 may comprise 3 axis accelerometer(s), 3-axis gyroscope(s), and/or magnetometer(s), may provide velocity, orientation, and/or other position related information to processor(s) 850. In some embodiments, the output of IMU 870 may be used by processor(s) 850 to determine a position and orientation UE 210 and/or determine that UE 210 is mobile. In instances where UE 210 serves as an access point, information derived from measurements by IMU 870 may be provided as part of mobility indication information for UE 210.

In some embodiments, UE 210 may include various optional additional sensors 882. In some embodiments, additional sensors 882 may optionally include one or more of: a magnetometer, an altimeter, and/or a barometer, which may provide inputs to processor(s) 850 to facilitate position determination including determination of altitude, direction of movement, etc. Additional sensors 882 may optionally include biometric sensors, which may record movement of a body based on biometric information, etc. In some embodiments, additional sensors 882 may optionally include one or more of ultrasonic transducers, rangefinders, and/or depth sensors, which may be used to acquire depth information and/or determine distance. In general, the list of sensors above in not exhaustive. In instances where UE 210 serves as an access point, information based on measurement by additional sensors 882 may be provided as part of mobility indication information for UE 210. Further, in instances where UE 210 serves as an access point, UE 210 may perform one or more of methods 300, 400, and 700.

The elements and methodologies described herein may be implemented by various means depending upon the application. For example, these elements and methodologies may be implemented in hardware, firmware, software, or any combination thereof. For example, for a hardware implementation, the processor(s) 850 may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, electronic devices, other electronic units designed to perform the functions described herein, or a combination thereof. The techniques disclosed may also be implemented using hardware (e.g. using functionality provided by an ASIC in processor(s) 850), software running on processor(s) 850, and/or firmware or stored in memory 830, or some combination thereof.

For a firmware and/or software implementation, the methodologies may be implemented using program code, microcode, procedures, functions, and so on that perform the functions described herein. Any machine-readable medium tangibly embodying instructions may be used in implementing the methodologies described herein. For example, program code may be stored in a non-transitory computer-readable medium 860 or memory 830 that is connected to and executed by processor(s) 850.

Memory may be implemented within processor(s) 850 or external to processor(s) 850. In some embodiments, memory 830 may hold program code that facilitates position determination for UE 210 and/or determination of mobility indication for UE 210. For example, one or more of wireless signal measurements, measurements by IMU 870, measurements by sensors 885 may stored in memory and may be used by program code to determine a location of UE 210 and/or mobility of UE 210 and/or to provide an indication of mobility of UE 210. In some embodiments, memory 830 and/or databases 835 in memory 830 may hold information about APs 100, including mobility indication information for APs 100. In some embodiments, mobility indication information associated with an AP 100-$i$ in memory 830 and/or databases 835 in memory 830 of UE 210 may indicate whether information associated with AP 100-$i$ may be used for location determination.

If implemented in firmware and/or software, the functions may be stored as one or more instructions or program code on a computer-readable medium, such as medium 860 and/or memory 830. Examples include computer-readable media encoded with computer programs and data associated with or used by the program. For example, the computer-readable medium including program code stored thereon may include program code to support hybrid photo mapping and navigation in a manner consistent with disclosed embodiments. The code may further support UE location determination and/or mobility indication determination.

Computer-readable medium 860 includes physical computer storage media. A storage medium may be any available medium that can be accessed by a computer. By way of example, and not limitation, such non-transitory computer-readable media can comprise RAM, ROM, EEPROM, CD-ROM, flash memory, or other optical disk storage, magnetic disk storage or other magnetic storage devices, or any other medium that can be used to store desired program code in the form of instructions and/or data and that can be accessed by a computer; disk and disc, as used herein, includes compact disc (CD), laser disc, optical disc, digital versatile disc (DVD), floppy disk and blu-ray disc where disks usually reproduce data magnetically, while discs reproduce data optically with lasers. Combinations of the above should also be included within the scope of computer-readable media.

In addition to storage on computer readable medium 860, instructions and/or data may be provided as signals on transmission media included in a communication apparatus. For example, a communication apparatus may include a transceiver 810, which may receive signals through receiver 814 indicative of instructions and data. The instructions and data may cause one or more processors to implement SPS/AFLT/hybrid-AFLT/RSTD/OTDOA measurement and positioning, and/or other functions outlined herein. That is, the communication apparatus includes transmission media with signals indicative of information to perform disclosed functions.

Memory 830 may represent any data storage mechanism. Memory 830 may include, for example, a primary memory and/or a secondary memory. Primary memory may include, for example, a random access memory, read only memory, etc. While illustrated in this example as being separate from processor(s) 850, it should be understood that all or part of a primary memory may be provided within or otherwise co-located/coupled with processor(s) 850. Secondary memory may include, for example, the same or similar type of memory as primary memory and/or one or more data storage devices or systems, such as, for example, a disk drive, an optical disc drive, a tape drive, a solid state memory drive, etc.

In certain implementations, secondary memory may be operatively receptive of, or otherwise configurable to couple to a non-transitory computer-readable medium 860. As such, in certain example implementations, the methods and/or apparatuses presented herein may take the form in whole or part of a computer-readable medium 860 that may include computer implementable instructions stored thereon, which when executed by at least one processor(s) 850 may be operatively enabled to perform all or portions of the example operations as described herein. Computer readable medium 860 may be a part of memory 830.

Figure 9:
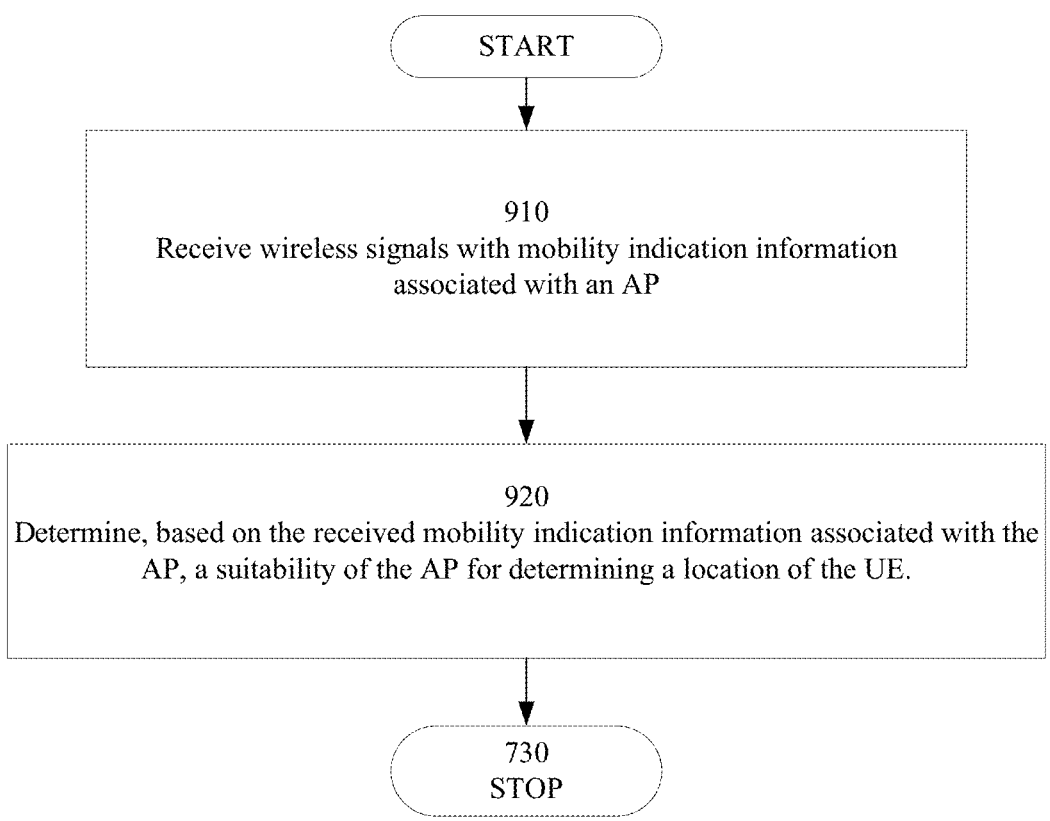
FIG. 9 shows a flowchart of an exemplary method 900 for utilization of mobility indication information.

FIG. 9 shows a flowchart of an exemplary method 900 for utilization of mobility indication information. In some embodiments, method 900 may be performed by UE 210/processor(s) 850.

In block 910, wireless signals from an AP 100-*i* may be received, wherein the wireless signals may comprise mobility indication information associated with AP 100-*i*. For example, the mobility indication information associated with AP 100-*i* may indicate that AP 100-*i* is mobile. As outlined above, the mobility indication information may also provide other mobility information related to AP 100-*i*.

In block 920, based on the received mobility indication information associated with AP 100-*i*, a suitability of AP 100-*i* for determining a location of UE 210 may be determined.

The mobility indication information for AP 100-*i* may further comprise one or more of: an indication of a range over which displacement of the AP occurs; or a pattern of movement associated with AP 100-*i*; or one or more time periods over which AP 100-*i* is mobile; or a location information associated with a current location of AP 100-*i*; or a location uncertainty information associated with the current location of AP 100-*i*; or a speed of movement of AP 100-*i*; or a direction of movement of AP 100-*i*; or a time of expiry for the mobility indication information for AP 100-*i*, or a vehicle or vehicle type associated with AP 100-*i*.

In some embodiments, the method may further comprise determining the location of UE 210 by utilizing the mobility indication information associated with AP 100-*i*. For example, the location of UE 210 may determined by weighting, based on the location uncertainty information associated with the current location of AP 100-*i*, measurements of the received wireless signals. In some embodiments, the method may further comprise: excluding, based on the suitability of AP 100-*i*, measurements of the received wireless signals, when determining the location of UE 210.

In some embodiments, the mobility indication information associated with AP 100-*i* may be transmitted by UE 210 to one or more of: a location server communicatively coupled to UE 210, or one or more other UEs communicatively coupled to UE 210.

Although the disclosure is illustrated in connection with specific embodiments for instructional purposes, embodiments are not limited thereto. Various adaptations and modifications may be made without departing from the scope. Therefore, the spirit and scope of the appended claims should not be limited to the foregoing description.

What is claimed is:

1. A processor-implemented method on a first Access Point (AP) for providing a mobility indication information indicative of mobility of the first AP, the method comprising:
   determining the mobility indication information for the first AP, based, in part, on at least one of:
      wireless signal measurements by:
         determining a similarity score based on first wireless signal strength measurements at a first time for a set of second APs, and second wireless signal strength measurements at a second time for the set of second APs, and
         determining that the first AP is mobile when the similarity score is below a threshold; or
      sensor measurements associated with the first AP, by
         determining an altitude based on barometer measurements or altimeter measurements, wherein the sensor measurements associated with the first AP comprise the barometer measurements or the altimeter measurements, and
         determining a speed of the first AP and a direction of movement of the first AP relative to a reference frame based, in part, on Inertial Measurement Unit (IMU) measurements, wherein the sensor measurements associated with the first AP comprise the IMU measurements; or
      any combinations thereof; and
   transmitting the mobility indication information from the first AP to another entity.

2. The method of claim 1, wherein the mobility indication information for the first AP further comprises:
   information indicating that the first AP is mobile and that the first AP is not suitable for location determination of another device; or
   information indicating that the first AP is mobile and further includes a request to remove location related information associated with the first AP from one or more of: location determination databases, location assistance databases, or base station almanacs.

3. The method of claim 1, wherein the mobility indication information for the first AP further comprises one or more of:
   an indication of a range over which displacement of the first AP occurs; or
   a pattern of movement associated with the first AP; or one or more time periods over which the first AP is mobile; or a location information associated with a current location of the first AP; or a location uncertainty information associated with the current location of the first AP; or the speed of the first AP; or the direction of movement of the first AP; or a time of expiry for the mobility indication information for the first AP, or a vehicle or vehicle type associated with the first AP.

4. The method of claim 1, further comprising:
providing an indication of mobility in an identifier broadcast by the first AP.

5. A processor-implemented method on a first Access Point (AP) for providing a mobility indication information indicative of mobility of the first AP, the method comprising:
determining the mobility indication information of the first AP, based, in part, on wireless signal measurements by:
determining a similarity score based on first wireless signal strength measurements at a first time for a set of second APs, and second wireless signal strength measurements at a second time for the set of second APs, and
determining that the first AP is mobile when the similarity score is below a threshold; and
transmitting the mobility indication information from the first AP to another entity.

6. A processor-implemented method on an Access Point (AP) for providing a mobility indication information indicative of mobility of the AP, the method comprising:
determining the mobility indication information of the AP based, in part, on sensor measurements associated with the AP by:
determining an altitude based on barometer measurements or altimeter measurements, wherein the sensor measurements associated with the AP comprise the barometer measurements or the altimeter measurements, and
determining a speed of the AP and a direction of movement of the first AP relative to reference frame based, in part, on Inertial Measurement Unit (IMU) measurements, wherein the sensor measurements associated with the AP comprise the IMU measurements; and
transmitting the mobility indication information from the AP to another entity.

7. The method of claim 6, wherein determining the mobility indication information of the AP, further comprises:
determining, based on the altitude of the AP, the speed of the AP, and the direction of movement of the AP, a vehicle type associated with the AP; and
including one or more of: the altitude of the AP, the speed of the AP, the direction of movement of the AP, or the vehicle type, as part of the mobility indication information for the AP.

8. A processor-implemented method on an Access Point (AP) for providing a mobility indication information indicative of mobility of the AP, the method comprising:
determining the mobility indication information of the AP based, in part, on wireless signal measurements associated with the AP by:
determining, based, in part, on the wireless signal measurements, an association of the AP with a vehicular navigation system,
determining based on information from the vehicular navigation system one or more of: an altitude of the AP, a speed of the AP, and a direction of movement of the AP, or a vehicle type associated with the AP, and
including one or more of: the altitude of the AP, the speed of the AP, the direction of movement of the AP, or the vehicle type, as part of the mobility indication information for the AP.

9. An apparatus comprising:
a memory;
a processor coupled to the memory and configured to:
determine a mobility indication information indicative of mobility of the apparatus, based, in part, on at least one of:
wireless signal measurements, wherein the processor is further configured to:
determine a similarity score based on first wireless signal strength measurements at a first time for a set of Access Points (APs), and second wireless signal strength measurements at a second time for the set of APs, and
determine that the apparatus is mobile when the similarity score is below a threshold; or
sensor measurements associated with the apparatus, wherein the processor is further configured to:
determine an altitude based on barometer measurements or altimeter measurements, wherein the sensor measurements associated with the apparatus comprise the barometer measurements or the altimeter measurements, and
determine a speed of the apparatus and a direction of movement of the apparatus relative to reference frame based, in part, on Inertial Measurement Unit (IMU) measurements, wherein the sensor measurements associated with the apparatus comprise the IMU measurements; or
any combinations thereof; and
a transceiver configured to:
transmit the mobility indication information from the apparatus to another entity.

10. The apparatus of claim 9, wherein the mobility indication information for the apparatus further comprises:
information indicating that the apparatus is mobile and that the apparatus is not suitable for location determination of another device; or
information indicating that the apparatus is mobile and further includes a request to remove location related information associated with the apparatus from one or more of: location determination databases, location assistance databases, or base station almanacs.

11. The apparatus of claim 9, wherein the mobility indication information for the apparatus further comprises one or more of:
an indication of a range over which displacement of the apparatus occurs;
a pattern of movement associated with the apparatus; or
one or more time periods over which the apparatus is mobile; or
a location information associated with a current location of the apparatus; or
a location uncertainty information associated with the current location of the apparatus; or
the speed of the apparatus; or
the direction of movement of the apparatus; or
a time of expiry for the mobility indication information for the apparatus, or
a vehicle or vehicle type associated with the apparatus.

12. The apparatus of claim 9, wherein the processor is further configured to:
provide an indication of mobility in an identifier broadcast by the apparatus.

13. An apparatus comprising:
a memory;
a processor coupled to the memory, wherein the processor is configured to:
determine a mobility indication information of the apparatus, based, in part, on the wireless signal measurements, wherein the processor is further configured to:
determine a similarity score based on first wireless signal strength measurements at a first time for a set of APs, and second wireless signal strength measurements at a second time for the set of APs, and
determine that the apparatus is mobile when the similarity score is below a threshold; and
transmit the mobility indication information from the apparatus to another entity.

14. An apparatus comprising:
a memory;
a processor coupled to the memory, wherein the processor is configured to:
determine a mobility indication information of the apparatus based, in part, on sensor measurements associated with the apparatus, wherein the processor is further configured to:
determine an altitude based on barometer measurements or altimeter measurements, wherein the sensor measurements associated with the apparatus comprise the barometer measurements or the altimeter measurements, and
determine a speed of the apparatus and a direction of movement relative to reference frame of the apparatus based, in part, on Inertial Measurement Unit (IMU) measurements, wherein the sensor measurements associated with the apparatus comprise the IMU measurements; and
transmit the mobility indication information from the apparatus to another entity.

15. The apparatus of claim 14, wherein the processor is further configured to:
determine, based on the altitude of the apparatus, the speed of the apparatus, and the direction of movement of the apparatus, a vehicle type associated with the apparatus; and
include one or more of: the altitude of the apparatus, the speed of the apparatus, the direction of movement of the apparatus, or the vehicle type, as part of the mobility indication information for the apparatus.

16. An apparatus comprising:
a memory;
a processor coupled to the memory and configured to:
determine a mobility indication information indicative of mobility of the apparatus, based, in part, on wireless signal measurements, wherein the processor is further configured to:
determine, based, in part, on the wireless signal measurements, an association of the apparatus with a vehicular navigation system;
determine, based on information from the vehicular navigation system one or more of: an altitude of the apparatus, a speed of the apparatus, and a direction of movement of the apparatus, or a vehicle type associated with the apparatus;
include one or more of: the altitude of the apparatus, the speed of the apparatus, the direction of movement of the apparatus, or the vehicle type associated with the apparatus, as part of the mobility indication information for the apparatus; and
a transceiver configured to:
transmit the mobility indication information from the apparatus to another entity.

17. An apparatus comprising:
means for determining a mobility indication information indicative of mobility of the apparatus, based, in part, on at least one of:
wireless signal measurements, wherein means for determining the mobility indication information further comprises:
means for determining a similarity score based on first wireless signal strength measurements at a first time for a set of Access Points (APs), and second wireless signal strength measurements at a second time for the set of APs, and
means for determining that the apparatus is mobile when the similarity score is below a threshold; or
sensor measurements associated with the apparatus, wherein means for determining the mobility indication information further comprises:
means for determining an altitude based on measurements by barometer means or altimeter means, wherein the sensor measurements associated with the apparatus comprise the measurements by barometer means or altimeter means, and
means for determining a speed of the apparatus and a direction of movement of the apparatus relative to reference frame based, in part, on measurements by Inertial Measurement Unit (IMU) means, wherein the sensor measurements associated with the apparatus comprise the measurements by IMU means; or
any combinations thereof; and
means for transmitting the mobility indication information from the apparatus to another entity.

18. The apparatus of claim 17, wherein the mobility indication information for the apparatus further comprises:
information indicating that the apparatus is mobile and that the apparatus is not suitable for location determination of another device; or
information indicating that the apparatus is mobile and further includes a request to remove location related information associated with the apparatus from one or more of: location determination databases, location assistance databases, or base station almanacs.

19. The apparatus of claim 17, wherein the mobility indication information for the apparatus further comprises one or more of:
an indication of a range over which displacement of the apparatus occurs;
a pattern of movement associated with the apparatus; or
one or more time periods over which the apparatus is mobile; or
a location information associated with a current location of the apparatus; or
a location uncertainty information associated with the current location of the apparatus; or
the speed of the apparatus; or
the direction of movement of the apparatus; or
a time of expiry for the mobility indication information for the apparatus, or
a vehicle or vehicle type associated with the apparatus.

20. A non-transitory computer-readable medium comprising instructions to cause a processor on a first Access Point (AP) to:
  determine a mobility indication information indicative of mobility of the first AP, based, in part, on at least one of:
    wireless signal measurements associated with the first AP, wherein the instructions further cause the processor to:
      determining a similarity score based on first wireless signal strength measurements at a first time for a set of second APs, and second wireless signal strength measurements at a second time for the set of second APs, and
      determining that the first AP is mobile when the similarity score is below a threshold; or
    sensor measurements associated with the first AP, wherein the instructions further cause the processor to:
      determine an altitude based on barometer measurements or altimeter measurements, wherein the sensor measurements associated with the first AP comprise the barometer measurements or the altimeter measurements, and
      determine a speed of the first AP and a direction of movement of the first AP relative to reference frame based, in part, on Inertial Measurement Unit (IMU) measurements, wherein the sensor measurements associated with the first AP comprise the IMU measurements; or
    any combinations thereof; and
  transmit the mobility indication information from the first AP to another entity.

21. The computer-readable medium of claim 20, wherein the mobility indication information for the first AP further comprises:
  information indicating that the first AP is mobile and that the first AP is not suitable for location determination of another device; or
  information indicating that the first AP is mobile and further includes a request to remove location related information associated with the first AP from one or more of: location determination databases, location assistance databases, or base station almanacs.

22. The computer-readable medium of claim 20, wherein the mobility indication information for the first AP further comprises one or more of:
  an indication of a range over which displacement of the first AP occurs; or
  a pattern of movement associated with the first AP; or
  one or more time periods over which the first AP is mobile; or
  a location information associated with a current location of the first AP; or
  a location uncertainty information associated with the current location of the first AP; or
  the speed of the first AP; or
  the direction of movement of the first AP; or
  a time of expiry for the mobility indication information for the first AP, or
  a vehicle or vehicle type associated with the first AP.

23. The computer-readable medium of claim 20, wherein the instructions to determining the mobility indication information of the first AP, based, in part, on measurements by the sensors on the first AP, cause the processor to:
  determine an altitude based on barometer measurements or altimeter measurements, wherein the sensor measurements associated with the first AP comprise the barometer measurements or the altimeter measurements, and
  determining a speed of the first AP and a direction of movement of the first AP based on Inertial Measurement Unit (IMU) measurements, wherein the sensor measurements associated with the first AP comprise the IMU measurements.

24. The computer-readable medium of claim 23, wherein the instructions further cause the processor to:
  determine, based on the altitude of the first AP, the speed of the first AP, and the direction of movement of the first AP, a vehicle type associated with the first AP; and
  associate one or more of: the altitude of the first AP, the speed of the first AP, the direction of movement of the first AP, or the vehicle type, as part of the mobility indication information for the first AP.

* * * * *